US012576912B2

(12) United States Patent
Zhang et al.

(10) Patent No.: US 12,576,912 B2
(45) Date of Patent: Mar. 17, 2026

(54) VEHICLE CHASSIS AND VEHICLE

(71) Applicant: Apollo Intelligent Connectivity (Beijing) Technology Co., Ltd., Beijing (CN)

(72) Inventors: Fuqing Zhang, Beijing (CN); Song Zhang, Beijing (CN); Xin Fu, Beijing (CN); Fuchuang Wu, Beijing (CN); Aihua Liu, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 621 days.

(21) Appl. No.: 18/077,357

(22) Filed: Dec. 8, 2022

(65) Prior Publication Data

US 2023/0108092 A1 Apr. 6, 2023

(30) Foreign Application Priority Data

Dec. 9, 2021 (CN) .......................... 202111502370.1
Dec. 9, 2021 (CN) .......................... 202123087181.0

(51) Int. Cl.
*B62D 21/09* (2006.01)
*B62D 5/04* (2006.01)
(52) U.S. Cl.
CPC .............. *B62D 21/09* (2013.01); *B62D 5/04* (2013.01)
(58) Field of Classification Search
CPC ........ B62D 21/09; B62D 5/04; B62D 5/0421; B62D 5/0424; B62D 24/00; B62D 21/10;

(Continued)

(56) References Cited

U.S. PATENT DOCUMENTS 6,491,141 B1 12/2002 Severinsson
8,495,912 B2 * 7/2013 Kjerstad .................. H01Q 9/18
73/170.29

(Continued)

FOREIGN PATENT DOCUMENTS

CA 3082042 A1 * 5/2019 ............. B64D 47/08
CN 201450100 U * 5/2010

(Continued)

OTHER PUBLICATIONS

Translated CN-109428021-A (Year: 2025).*

(Continued)

*Primary Examiner* — James A Shriver, II
*Assistant Examiner* — Ian Bryce Shelton
(74) *Attorney, Agent, or Firm* — Keating & Bennett, LLP

(57) ABSTRACT

Provided are a vehicle chassis and a vehicle, which are related to a field of vehicle technology, in particular to fields of automatic driving technology and driving test technology. The vehicle chassis includes: a chassis support, a steering system, an electrical system, a driving system, and two brake systems. The chassis support is provided with a steering system mounting site, an electrical system mounting site, a driving system mounting site, and two brake system mounting sites; which are arranged in sequence along a length direction of the vehicle chassis. A first brake system mounting site is disposed between the steering system mounting site and the electrical system mounting site; and a second brake system mounting site is disposed between the driving system mounting site and the electrical system mounting site. The two brake systems, the driving system and the steering system are communicatively connected to the electrical system.

16 Claims, 9 Drawing Sheets

20

(58) Field of Classification Search

CPC .... B62D 21/18; B62D 5/0403; B62D 5/0418; B62D 63/04; B60G 3/01; B60K 17/043; B60K 1/04; B60K 7/0007; B60T 2201/022; B60T 7/22; B60T 1/067; G01M 17/007; H01Q 1/18; H01Q 1/3291; H01Q 1/325; B60Y 2410/10

See application file for complete search history.

(56) References Cited

U.S. PATENT DOCUMENTS

| | | | | |
|---|---|---|---|---|
| 10,266,199 | B2 | | 4/2019 | Gong et al. |
| 10,793,001 | B2 * | | 10/2020 | Yu .......................... F16H 7/1281 |
| 11,078,977 | B1 * | | 8/2021 | Gilbert .................... B60T 1/067 |
| 2011/0296908 | A1 * | | 12/2011 | Kjerstad .................. H01Q 1/04 |
| | | | | 248/440.1 |
| 2017/0113716 | A1 | | 4/2017 | Gong et al. |
| 2019/0301977 | A1 * | | 10/2019 | Jeong .................. G01M 17/007 |
| 2019/0337382 | A1 * | | 11/2019 | Yu .......................... B60K 17/14 |
| 2021/0046913 | A1 * | | 2/2021 | Wirthl ................... B60T 8/1761 |
| 2021/0364050 | A1 * | | 11/2021 | Jung ...................... F16D 51/24 |
| 2022/0118807 | A1 * | | 4/2022 | Pan ....................... B60G 13/003 |
| 2023/0061860 | A1 * | | 3/2023 | Son ....................... F16D 51/22 |
| 2023/0399047 | A1 * | | 12/2023 | Sung .................... B62D 5/0454 |

FOREIGN PATENT DOCUMENTS

| | | | | | |
|---|---|---|---|---|---|
| CN | 202201106 | U | * | 4/2012 | |
| CN | 106891987 | A | * | 6/2017 | .......... B62D 5/0463 |
| CN | 108344586 | A | | 7/2018 | |
| CN | 109428021 | A | * | 3/2019 | .......... H01M 50/20 |
| CN | 109533016 | A | | 3/2019 | |
| CN | 109591881 | A | * | 4/2019 | .......... B62D 5/0421 |
| CN | 208825294 | U | | 5/2019 | |
| CN | 208881767 | U | * | 5/2019 | |
| CN | 209409730 | U | * | 9/2019 | |
| CN | 110617972 | A | * | 12/2019 | .............. G01M 7/08 |
| CN | 110778668 | A | * | 2/2020 | .......... B60G 13/005 |
| CN | 211335502 | U | | 8/2020 | |
| CN | 211667065 | U | * | 10/2020 | |
| CN | 111999074 | B | | 9/2021 | |
| CN | 113607425 | A | * | 11/2021 | .......... G01M 17/007 |
| CN | 113752935 | A | * | 12/2021 | .............. B60P 3/07 |
| CN | 216916011 | U | | 7/2022 | |
| JP | 04-073074 | A | | 3/1992 | |
| JP | 06-20151 | U | | 3/1994 | |
| JP | 10-507712 | A | | 7/1998 | |
| JP | 10194108 | A | * | 7/1998 | |
| JP | H10194108 | A | | 7/1998 | |
| JP | 2014-208530 | A | | 11/2014 | |
| JP | 2017-511279 | A | | 4/2017 | |
| KR | 101880615 | B1 | * | 7/2018 | .............. H01Q 1/18 |
| KR | 101978817 | B1 | * | 5/2019 | .......... B62D 5/0445 |

OTHER PUBLICATIONS

Translated CN-109591881-A (Year: 2025).*
Translated CN-110778668-A (Year: 2025).*
Translated CN-113607425-A (Year: 2025).*
Translated CN-208881767-U (Year: 2025).*
Translated CN-209409730-U (Year: 2025).*
Translated CN-211667065-U (Year: 2025).*
Translated JP-10194108-A (Year: 2025).*
Official Communication issued in corresponding Japanese Patent Application No. 2022-196335, mailed on Aug. 29, 2023.
Official Communication issued in corresponding European Patent Application No. 22212437.2, mailed on Sep. 18, 2023.
Official Communication issued in corresponding Chinese Patent Application No. 202111502370.1, mailed on Jan. 10, 2025, 17 pages.
Official Communication issued in corresponding Chinese Patent Application No. 202111502370.1, mailed on Jun. 17, 2025, 15 pages.

* cited by examiner

100

20

310

460

13311

13311-2

13311-2

13311-2

13311-2

13311-1

140

1410

1420

VEHICLE CHASSIS AND VEHICLE

CROSS-REFERENCE TO RELATED APPLICATIONS

This application is claims priority to Chinese Application No. 202111502370.1 filed on Dec. 9, 2021 and Chinese Application No. 202123087181.0 filed on Dec. 9, 2021, which are incorporated herein by reference in their entirety.

TECHNICAL FIELD

The present disclosure relates to a field of vehicle technology, in particular to fields of automatic driving technology and driving test technology, and more specifically to a vehicle chassis and a vehicle.

BACKGROUND

With a development of electronic technology and network technology, automatic driving technology has become one of the important development directions in the Internet field and a vehicle field. Mature automatic driving technology may free the driver's hands and reduce or even avoid traffic accidents to a certain extent. Before the automatic driving vehicle leaves the factory, it usually needs to pass a lot of tests and trials to ensure a reliability of the automatic driving technology.

SUMMARY

It provides a vehicle chassis and a vehicle applicable to a wider range of scenarios.

An aspect of the present disclosure provides a vehicle chassis, including a chassis support, a steering system, an electrical system, a driving system, and two brake systems. The chassis support is provided with a steering system mounting site, an electrical system mounting site, a driving system mounting site and two brake system mounting sites. The steering system mounting site, the electrical system mounting site and the driving system mounting site are arranged in sequence along a length direction of the vehicle chassis; a first brake system mounting site of the two brake system mounting sites is disposed between the steering system mounting site and the electrical system mounting site; and a second brake system mounting site of the two brake system mounting sites is disposed between the driving system mounting site and the electrical system mounting site, The two brake systems, the driving system and the steering system are communicatively connected to the electrical system.

Another aspect of the present disclosure provides a vehicle, including a housing and the vehicle chassis provided by the present disclosure, and the housing is located above the vehicle chassis and covers the vehicle chassis.

It should be understood that the content described in this part is not intended to identify key or important features of the embodiments of this disclosure, nor is it intended to limit the scope of the present disclosure. Other features of the present disclosure will be readily understood by the following description.

BRIEF DESCRIPTION OF THE DRAWINGS

The drawings are used to better understand the scheme and do not constitute a limitation of the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The present disclosure provides a vehicle chassis, including a chassis support, a steering system, an electrical system, a driving system and two brake systems. The chassis support is provided with a steering system mounting site, an electrical system mounting site, a driving system mounting site and two brake system mounting sites. The steering system mounting site, the electrical system mounting site and the driving system mounting site are arranged in sequence along a length direction of the vehicle chassis. A first brake system mounting site of the two brake system mounting sites is disposed between the steering system mounting site and the electrical system mounting site. A second brake system mounting site of the two brake system mounting sites is disposed between the driving system mounting site and the electrical system mounting site. The two brake systems, the driving system and the steering system are communicatively connected to the electrical system.

The application scenario of a vehicle chassis and a vehicle provided in this disclosure will be described below with reference to FIG. 1.

Figure 1:
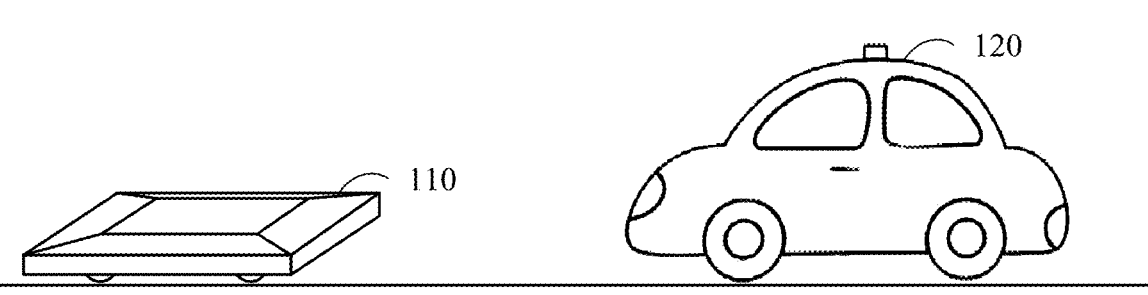
FIG. 1 is a schematic diagram of an application scenario of a vehicle chassis and a vehicle according to an embodiment of the present disclosure.

FIG. 1 is a schematic diagram of the application scenario of the vehicle chassis and the vehicle according to an embodiment of the present disclosure.

As shown in FIG. 1, an application scenario 100 includes a test target vehicle 110 and an automatic driving vehicle 120.

In the application scenario 100, the automatic driving vehicle 120 may be a vehicle before leaving the factory or a vehicle that needs to be repaired after leaving the factory. In testing the automatic driving vehicle 120, the test target vehicle 110 may act as a vehicle which is simulated as driving on a road, so as to test the obstacle avoidance and other functions of the automatic driving vehicle 120.

For example, the test target vehicle 110 may be provided on the road on which the automatic driving vehicle 120 is located, to test whether the automatic driving vehicle 120 may automatically change lanes when driving near the test target vehicle 110, or whether the automatic driving vehicle 120 may decelerate, etc. so as to achieve automatic driving safety test, etc.

According to the embodiment of the present disclosure, the test target vehicle 110 may be, for example, a robot automatically traveling on the ground. The test target vehicle 110 may be driven by the motor to reach a specified speed. For example, in the embodiment, a driving path may be set for the test target vehicle 110 in advance in the background, and the test target vehicle 110 may drive according to the driving path to simulate a vehicle in the real road condition. Alternatively, the test target vehicle 110 may be used in the object transport scene to transport the target vehicle which is damaged by collision, or any object that may be carried by the test target vehicle 110. For example, the test target vehicle 110 may also be used as an intelligent conveying robot.

In an embodiment, the test target vehicle 110 may include a vehicle chassis and a housing. The vehicle chassis will be described in detail below with reference to FIGS. 2 to 11. It should be understood that the vehicle chassis in FIGS. 2 to 11 may also be used as the vehicle chassis of the intelligent driving vehicle such as an automatic driving car and the intelligent conveying robot, which is not limited in the present disclosure.

Figure 2:
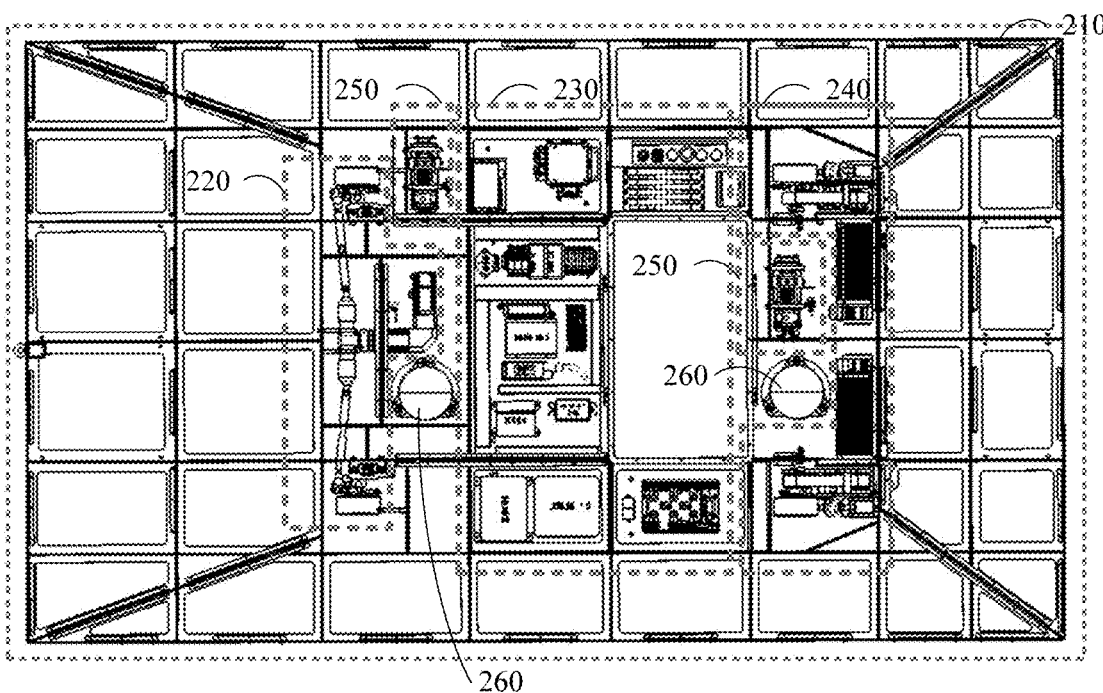
FIG. 2 is a structural diagram of a vehicle chassis according to an embodiment of the present disclosure.

FIG. 2 is a structural diagram of a vehicle chassis according to an embodiment of the present disclosure.

As shown in FIG. 2, the vehicle chassis 20 of this embodiment may include a chassis support 210, a steering system 220, an electrical system 230, a driving system 240 and two brake systems 250.

The chassis support 210 is provided with a steering system mounting site, an electrical system mounting site, a driving system mounting site and two brake system mounting sites. The steering system mounting site, the electrical system mounting site, the driving system mounting site and two brake system mounting sites are respectively used to receive the steering system 220, the electrical system 230, the driving system 240 and two brake systems 250.

The steering system mounting site, the electrical system mounting site and the driving system mounting site are arranged in sequence along a length direction of the vehicle chassis 20, so that the steering system, the electrical system and the driving system are arranged in sequence along the length direction of the vehicle chassis 20.

A first brake system mounting site of the two brake system mounting sites may be disposed between the steering system mounting site and the electrical system mounting site, such that a first brake system is disposed in an idle space between the steering system 220 and the electrical system 230. The first brake system is in a transmission connection with the steering system 220 to achieve a front brake function of the vehicle including the vehicle chassis 20.

A second brake system mounting site of the two brake system mounting sites may be disposed between the driving system mounting site and the electrical system mounting site, such that a second brake system is disposed in an idle space between the driving system 240 and the electrical system 230. The second brake system is in a transmission connection with the driving system 240 to achieve a rear brake function of the vehicle including the vehicle chassis 20.

The electrical system 230 may include a power supply module and a control module. Various electric devices in the steering system 220, the driving system 240 and the two brake systems 250 are electrically connected to the power supply module, so that the power supply module may provide electric energy for these electric devices. Various electric device in the steering system 220, the driving system 240 and the two brake systems 250 are communicatively connected to the control module in order to control operations of these electric devices.

This embodiment, by providing two brake systems, it is possible to separately control a steering wheel and a driving wheel, so as to improve brake performance. Furthermore, by limiting the mounting sites of the steering system, the two brake systems, the electrical system and the driving system, it is convenient to achieve a miniaturization and flat design of the vehicle chassis, so as to facilitate an expansion of the application scenarios of the vehicle including the vehicle chassis.

In an embodiment, the vehicle chassis 20 may further include two antenna modules 260. The two antenna modules 260 may be configured to receive signals to be transmitted to a display device, a radio, a car phone and other devices in an integrated navigation device in the vehicle. The two antenna modules 260 may be communicatively connected to the electrical system, specifically communicatively connected to communication devices in the electrical system to transmit the received signals to the display device, the radio, the car phone and other devices.

Accordingly, the chassis support 210 may further be provided with two antenna mounting sites. A first antenna mounting site of the two antenna mounting sites may be located between the steering system mounting site and the electrical system mounting site. A second antenna mounting site of the two antenna mounting sites may be located between the driving system mounting site and the electrical system mounting site. Furthermore, the first antenna mounting site and the first brake system mounting site may be arranged in sequence along a width direction of the vehicle chassis 20, and the second antenna mounting site and the second brake system mounting site may be arranged in sequence along the width direction of the vehicle chassis. In this way, one antenna module may be disposed in a space between the steering system 220 and the electrical system 230, and the other one antenna module may be disposed in a space between the driving system 240 and the electrical system 230. Thus, the space between the steering system and the electrical system, and the space between the driving system and the electrical system may be fully utilized. In this way, various systems on the vehicle chassis may be arranged compactly, so as to facilitate the miniaturization design of the vehicle chassis and the vehicle including the vehicle chassis.

In an embodiment, the vehicle chassis 20 may further include a cover plate, which detachably covers the chassis support 210. The cover plate may include an upper cover plate, a front cover plate, a rear cover plate and two side cover plates. The upper cover plate is configured to cover the top of each mounting site described above. The two side cover plates cover both sides of each mounting site of the chassis support 210 in a width direction of the chassis support 210. The front cover plate and the rear cover plate are respectively configured to cover both sides of each mounting site of the chassis support 210 in a length direction of the chassis support 210. A thickness of the cover plate(s) may be set as desired in practice, which is not limited in the present disclosure. By disposing the cover plates, the cover plates may protect the systems in the vehicle chassis from wind and rain.

In an embodiment, in a case that the electrical system 230 is mounted at the electrical system mounting site, an external electrical interface and/or a communication interface in the electrical system 230 is exposed to the cover plate, so that other electrical devices except the electrical device in the vehicle chassis, may be connected to the electrical interface and/or the communication interface.

Figure 3:
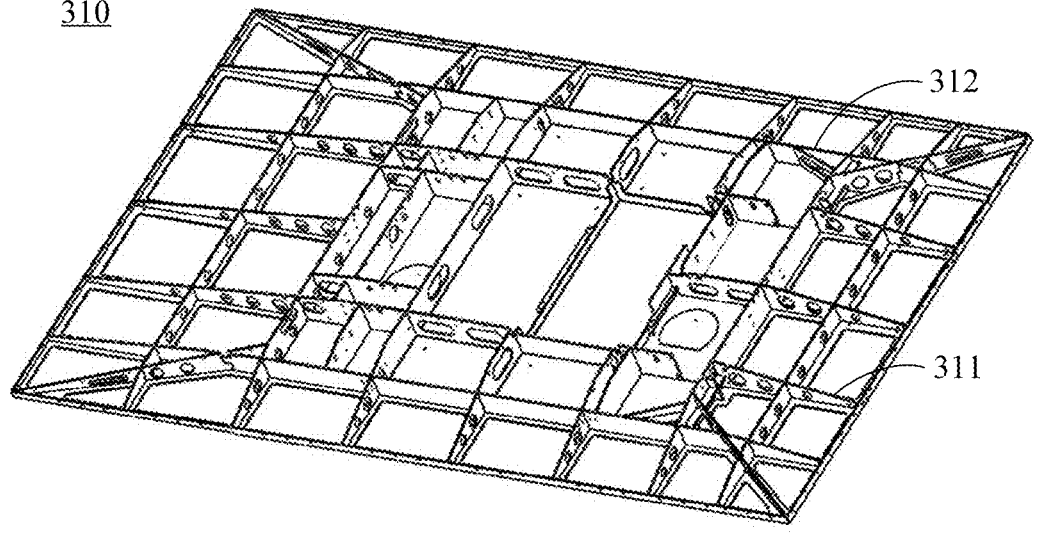
FIG. 3 is a structural diagram of a chassis support according to an embodiment of the present disclosure.

FIG. 3 is a structural diagram of a chassis support according to an embodiment of the present disclosure.

As shown in FIG. 3, in this embodiment, a plurality of first stiffeners 311 may be provided in an area of the chassis support 310 excluding the mounting sites. The plurality of first stiffeners 311 may extend upward from the chassis support, to improve an ability of rolling resistance of the chassis support. For example, the plurality of first stiffeners may have a height less than or equal to a height of the steering system mounting site, a height of the electrical system mounting site, a height of the driving system mounting site and a height of the two brake system mounting sites. This ensures that an overall height of the vehicle chassis is small. For example, the height of the vehicle chassis may be controlled within 5 cm. It may be understood that the above height of the vehicle chassis is only used as an example to facilitate understanding of the present disclosure, and the height of the vehicle chassis may be 3 cm, 2 cm, etc., which is not limited in the present disclosure.

In an embodiment, the chassis support 310 may be constructed as an integral structure, in order to improve a stability of the vehicle chassis and prevent the vehicle chassis from being damaged.

For example, it is also possible to reduce the height of the vehicle chassis by using the steering wheel with smaller diameter and the driving wheel with smaller diameter. In this way, it is convenient to expand an application range of the vehicle including the vehicle chassis. For example, by disposing a lower vehicle chassis for the test target vehicle, it is convenient to test the automatic driving vehicle to be tested with a lower chassis.

In an embodiment, as shown in FIG. 3, the chassis support 310 may be constructured to have flat ends and raised center. Specifically, both ends of the chassis support 310 in the length direction may be constructed to have slope surface. In this way, in a case that the vehicle chassis is a chassis of the test target vehicle, the slope surface is convenient for the automatic driving vehicle to be tested to roll.

In an embodiment, as shown in FIG. 3, the chassis support 310 may enclose the aforementioned mounting sites by using a plurality of side plates 312 disposed in a vertical direction. For example, the plurality of side plates may be provided with a plurality of wiring holes, which are configured to be passed through by the electrical wires, communication cables and the like between electrical devices in each system.

The structure of any one of the two antenna modules included in the vehicle chassis will be described in detail below with reference to FIG. 4.

Figure 4:
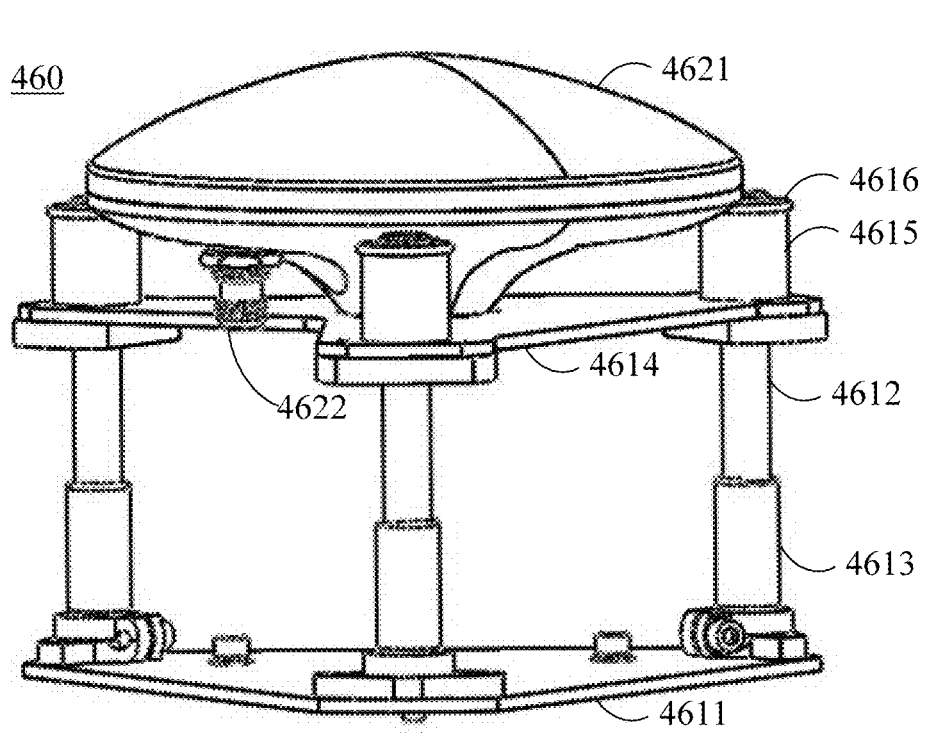
FIG. 4 is a structural diagram of an antenna module according to an embodiment of the present disclosure.

FIG. 4 is a structural diagram of an antenna module according to an embodiment of the present disclosure.

As shown in FIG. 4, an antenna module 460 of this embodiment may include an antenna assembly and an antenna support.

The antenna support may include a first fixing plate 4611, at least two first guide pillars 4612, at least two first elastic elements 4613 and a second fixing plate 4614.

Each of the at least two first guide pillars 4612 has one end being fixed on the first fixing plate 4611, the second fixing plate 4614 is sleeved on the at least two first guide pillars 4612, and the second fixing plate is movable along a length direction of the at least two first guide pillars 4612. The at least two first elastic elements 4613 are also sleeved on the at least two first guide pillars 4612, and each of the at least two first elastic elements 4613 may have one end being fixedly connected to the first fixing plate 4611. The other end of each of the at least two first elastic elements 4613 opposite to the one end of each of the at least two first elastic elements may be fixed on the second fixing plate 4614. Alternatively, the other end of each of the at least two first elastic elements 4613 may be a free end. At least two first elastic elements 4613 may be located between the first fixing plate 4611 and the second fixing plate 4614. That is, the second fixing plate 4614 is sleeved on an area of the at least two first guide pillars 4612, which is close to the other end of the at least two first guide pillars 4612 with respect to the at least two first elastic elements 4613.

The other end of each of the at least two first guide pillars 4612 may be, for example, a free end. Alternatively, the other end of each of the at least two first guide pillars 4612 may be provided with an outer edge structure, and the size of the outer edge structure is larger than the size of each of the first guide pillars, in order to limit the movement of the second fixing plate 4614. In this way, in a case that the second fixing plate 4614 is under pressure, the second fixing plate 4614 may move along a direction of the at least two first guide pillars 4612 in a direction of approaching the first fixing plate 4611, and at least two first elastic elements 4613 may be compressed. After the pressure disappears, the second fixing plate 4614 may move in a direction of leaving from the first fixing plate 4611 under an elastic force of the at least two first elastic elements 4613.

The antenna assembly 420 may be connected to the antenna support via a fixing element on the second fixing plate 4614 in the antenna support. For example, if the fixing element on the second fixing plate 4614 includes a threaded rod, the antenna assembly should be correspondingly provided with a threaded hole, and a connection between the antenna support and the antenna assembly is implemented by a threaded connection between the threaded rod and the threaded hole.

As shown in FIG. 4, the antenna assembly may include an antenna head 4621 and an antenna port 4622. The antenna head 4621 may be, for example, a mushroom head structure or a rectangular head structure. For example, the antenna port 4622 may be, for example, provided with a conversion cable which is configured to convert the received signals into signals that may be received by the radio, the car phone and other devices. The antenna port 4622 may, for example, protrude from a bottom end of the antenna head 4621.

In an embodiment, the antenna assembly may be an antenna assembly included in the integrated navigation device in the vehicle. For example, it may include a GPS antenna. The antenna assembly may be the mushroom head structure or the like, which is not limited in the present disclosure. In an embodiment, the antenna assembly may further be configured to receive signals transmitted to the radio, the car phone and other devices in the vehicle. It may be understood that the types of the above antenna assemblies are only used as examples to facilitate understanding of the present disclosure, which is not limited in the present disclosure.

In the antenna module 460 of this embodiment, an antenna support is provided for the antenna module, such that in a case that the antenna module is under pressure, the antenna module may move downward to retract into the housing of the device including the antenna module 460, so as to prevent the antenna module from being damaged. After the pressure disappears, the antenna assembly may return, under an action of the first elastic element in the antenna support, to the position at which the antenna assembly protrudes from the housing of the device including the antenna module 460, so as to ensure a stability of the signal received by the antenna assembly.

In an embodiment, the second fixing plate 4614 may be provided with at least two guide holes, and at least two first guide pillars 4612 pass through the at least two guide holes, so that the second fixing plate 4614 is sleeved on the at least two first guide pillars 4612.

In an embodiment, the second fixing plate 4614 is provided with a fixing element for fixing the objects carried by the second fixing plate 4614. The fixing element may be, for example, disposed at a center of the second fixing plate 4614. Alternatively, the number of fixing elements may more than one and the fixing elements are uniformly disposed on the second fixing plate 4614. The fixing element may be, for example, a threaded sleeve, a bolt, etc. The fixing element may be fixedly connected to a surface of the second fixing plate 4614 away from the first fixing plate 4611. The fixed connection may include, for example, welding, etc. For example, the second fixing plate 4614 may be provided with a location hole, and the fixing element may include a base and a threaded rod. The base is fixedly connected to a side of the second fixing plate 4614 close to the first fixing plate 4611, and the threaded rod passes through the location hole. In this way, the objects carried by the second fixing plate 4614 may be connected to the antenna support by a threaded connection.

In an embodiment, at least two first guide pillars 4612 may be fixed on the first fixing plate 4611 by at least two guide pillar fixing elements. Each of the at least two guide pillar fixing elements may include a snap ring and a fixing plate which are constructed as integral, and the first guide pillar is clamped on the first fixing plate 4611 through the snap ring. It may be understood that the structure of the guide pillar fixing element is only illustrative to facilitate understanding of the disclosure, and any structure of the guide pillar fixing element in the related technology may be employed, which is not limited in the disclosure.

In an embodiment, the number of at least two first guide pillars 4612 and the number of at least two first elastic elements 4613 may be 3, and the three first guide pillars 4612 may be fixedly connected to the first fixing plate 4611 uniformly. By setting the number of at least two first guide pillars 4612 and the number of at least two first elastic elements 4613, a stability of the antenna support may be improved.

As shown in FIG. 4, the antenna support of this embodiment may include at least two linear bearings 4615 in addition to the first fixing plate 4611, at least two first guide pillars 4612, at least two first elastic elements 4613 and the second fixing plate 4614.

The second fixing plate 4614 may be, for example, provided with at least two guide holes, and at least two linear bearings 4615 may be respectively disposed in the at least two guide holes and respectively sleeved on at least two first guide pillars. In an embodiment, the at least two linear bearings 4615 may be fixedly connected to the second fixing plate 4614 through a support plate or the like. That is, at least two guide holes of the second fixing plate 4614 are respectively sleeved on at least two first guide pillars 4612, at least two linear bearings 4615 are respectively sleeved on at least two first guide pillars 4612, and the linear bearings 4615 sleeved on the first guide pillars 4612 are located between the guide holes of the second fixing plate 4614 and the first guide pillars 4612.

By disposing the linear bearing 4615, a friction force generated when the second fixing plate 4614 moving in a length direction of the first guide pillar may be reduced, and the stability of the moving of the second fixing plate 4614 may be improved. It may be understood that the linear bearing 4615 may be constructed to have any structure in the relevant technology, and a material of the linear bearing 4615 may be plastic or metal, etc., which is not limited in the disclosure.

In an embodiment, as shown in FIG. 4, the antenna support in this embodiment may include at least two gaskets 4616 in addition to the first fixing plate 4611, at least two first guide pillars 4612, at least two first elastic elements 4613 and the second fixing plate 4614.

The at least two gaskets 4616 may be respectively fixed on one ends of at least two first guide pillars 4612 away from the first fixing plate 4611. A material of the at least two gaskets 4616 may be rubber or metal, etc. By providing the at least two gaskets 4616, a movement range of the second fixing plate 4614 may be limited. In an embodiment, the material of the at least two gaskets 4616 may be rubber, so as to reduce an impact on the ends of the at least two first guide pillars 4612 away from the first fixing plate 4611 when the second fixing plate 4614 moves to the ends of the at least two first guide pillars 4612 away from the first fixing plate 4611, thereby improving the stability of the overall structure of the antenna support.

In an embodiment, in the antenna support of the embodiment, the first fixing plate 4611 may be provided with a plurality of fixing holes being matched with the plurality of fixing holes through external fixing elements. For example, the antenna support may be detachably connected to other objects. The so called other objects may be objects other than the objects carried by the second fixing plate 4614. For example, the other objects may be mounting sites disposed on the housing of the vehicle chassis, etc., and the mounting sites are configured to mount the objects carried by the second fixing plate 4614. The external fixing elements may be, for example, screws, bolts and other fixing elements, which are not limited in the present disclosure.

In an embodiment, as shown in FIG. 4, in the antenna support of the embodiment, the second fixing plate 4614 may be a concave polygon. The number of the sides of the concave polygon may be associated with the number of at least two first guide pillars. For example, if the number of at least two first guide pillars is n, the number of sides of the concave polygon may be (n+1). The n first guide pillars may be respectively disposed at the n vertices of the concave polygon, which are the vertices with the vertex angle less than 180°. Correspondingly, in a case that the antenna assembly is connected to the antenna support, the antenna port 4622 is located at a space enclosed by two sides of the second fixing plate with an included angle greater than 180°.

In this embodiment, the second fixing plate is implemented as a concave polygon and the position of the antenna port in a case that the antenna component is connected to the antenna support is defined, such that the size of the antenna module is reduced to a certain extent, thereby preventing the antenna assembly from being crushed and facilitating the miniaturization design of the antenna module.

The structure of the steering system included in the vehicle chassis will be described in detail below with reference to FIG. 5 to FIG. 9.

Figure 5:
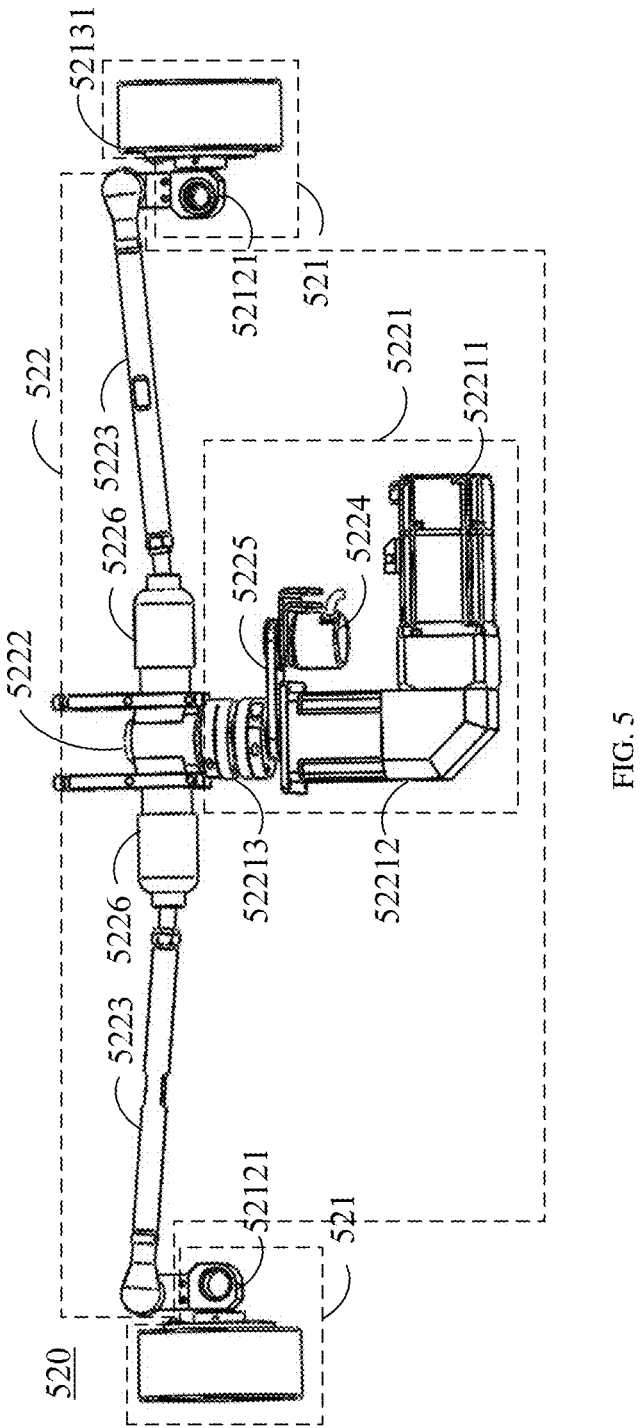
FIG. 5 is a structural diagram of a steering system according to an embodiment of the present disclosure.

FIG. 5 is a structural diagram of a steering system according to an embodiment of the present disclosure.

As shown in FIG. 5, the steering system 520 of this embodiment may include two steering wheel devices 521 and a steering driving device 522.

The steering wheel device 521 may include a corner joint 52121, a steering wheel hub and a steering wheel 52131. The steering driving device 522 may include a motor assembly 5221, a steering gear 5222, and two transmission bars 5223.

One end of the corner joint 52121 is connected to one of the two transmission bars, and the other end of the corner joint 52121 may be connected to the steering wheel hub. Specifically, one end of the corner joint 52121 may be connected to the other end of the transmission bar away from the motor, and the steering wheel hub may be sleeved on the other end of the corner joint 52121. The steering wheel 52131 may be sleeved on the steering wheel hub. In this way, when the transmission bar is driven by the motor to move along a length direction of the transmission bar, the transmission bar may drive the corner joint 52121 to rotate, and the corner joint 52121 may provide a force perpendicular to a current rotation direction for the steering wheel hub and the steering wheel 52131, so as to cause the steering wheel hub and the steering wheel 52131 to change the rotation direction.

In an embodiment, one end of the corner joint 52121 may be provided with a fixing hole. The transmission bar may fits the fixing hole through a connector, so as to achieve a connection between the transmission bar and the corner joint 52121.

The motor assembly 5221 may include, for example, a motor which acts as a power source. The function of the steering gear 5222 is to properly change a steering torque and a steering angle from the motor assembly 5221 (mainly to reduce a speed and increase a torque), and then output them to the transmission bar, such that the steering wheel device is pulled by the transmission bar to change the rotation direction. The steering gear 5222 may be constructed as a gear rack structure, a circulating ball structure, a worm crank finger pin structure, a power steering gear and other forms of structure, which are not limited in this disclosure.

In an embodiment, an input terminal of the steering gear 5222 is connected to an output shaft of motor assembly 5221, and the steering gear 5222 has two output terminals. For example, the steering gear 5222 may be constructed as a gear rack structure. The gear is connected to the output shaft of the motor assembly 5221, and two ends of the rack are respectively connected to two transmission bars. In this way, the gear is driven by the output shaft of the motor assembly 5221 to rotate, so as to cause the rack to move left and right relative to a central axis of the gear, and thus drive the two transmission bars to move. In other words, the input terminal of the steering gear 5222 may be driven by the motor assembly 5221 to rotate, so that the two output terminals of the steering gear 5222 are driven to move in a direction perpendicular to the input terminal.

The two transmission bars 5223 may have one end being, for example, hinged or fixedly connected to two output terminals of the steering gear, and the other end being hinged or fixedly connected to two steering wheel devices respectively. In this way, when the two output terminals of the steering gear move in the direction perpendicular to the input terminal, the two transmission bars 5223 may be driven to move. The movement of the two transmission bars 5223 may provide a force perpendicular to the rotation direction to the two steering wheel devices respectively connected to the two transmission bars 5223.

The steering wheel device 521 may further include a steering wheel. A rotation direction of the steering wheel may be controlled by the steering driving device 522, so as to change a driving direction of the vehicle including the steering system 520.

In an embodiment, the steering drive device 522 may further include a fixing plate and a fixing element. The fixing plate may be fixedly connected to the vehicle chassis through the fixing element, so as to fix the steering driving device on the vehicle chassis.

In the steering system of the embodiment of the present disclosure, the steering wheel may be driven to rotate by using the steering gear and the transmission bar may drive the steering wheel to rotate, so that the device structure may be simplified as compared with the steering driving device that requires an electromagnetic clutch or the like in the relevant technology. This facilitates the miniaturization design of the steering system and the vehicle. Furthermore, since one motor assembly drives two steering wheel devices to rotate, the miniaturization design of the steering system and the vehicle may further be facilitated.

According to the embodiment of the present disclosure, the motor assembly may include, for example, a speed reducer in addition to the motor, so as to match the speed and the torque transmission between the motor and the steering gear. With the speed reducer, the stable operation of the steering driving device may be facilitated, and the control accuracy of the steering wheel device may be improved.

For example, an input shaft of the speed reducer may be fixedly connected to an output shaft of the motor, and an output shaft of the speed reducer may be fixedly connected to the input terminal of the steering gear. In this way, the power of the motor may be transferred by a gear with fewer teeth on the input shaft of the speed reducer engaged with a big gear on the output shaft of the speed reducer, so as to achieve a purpose of speed reduction. It may be understood that different types of speed reducers may be selected as desired in practice, and this present disclosure does not limit the types of the speed reducers. For example, in the embodiment, a cylindrical gear speed reducer, a bevel gear speed reducer or a bevel cylindrical gear speed reducer, etc. may be employed.

In an embodiment, the speed reducer may be a right angle speed reducer, through which the direction of the power provided by the motor may be rotated by 90 degrees. In this way, the control accuracy of the steering wheel device may be improved, while the space occupied by the steering driving device in the length direction of the vehicle chassis when it is mounted on the vehicle chassis may be reduced as much as possible, thereby facilitating the miniaturization design of the vehicle.

In an embodiment, the motor assembly may be provided with a coupling in addition to the motor and the speed reducer. This ensures a mounting accuracy between the steering gear and the motor assembly, and effectively avoids a deviation of the steering driving device due to deformation or thermal expansion, etc.

As shown in FIG. 5, the motor assembly includes a motor 52211, a speed reducer 52212, and a coupling 52213. The speed reducer 52212 is a right angle speed reducer, an input shaft of the speed reducer 52212 is connected to an output shaft of the electrode 52211, an output shaft of the speed reducer 52212 is connected to one end of the coupling 52213, and the other end of the coupling 52213 is connected to the steering gear 5222. That is, the coupling 52213 is disposed between the steering gear 5222 and the speed reducer 52212. This ensures the mounting accuracy between the steering gear and the motor assembly.

The coupling may include two half rings. The two half rings may be connected with each other by key(s) or by tight fit(s). In mounting the steering drive device, the two semi-circle rings may be sleeved on the input terminal of the speed reducer 52212 and the steering gear, and then the two semicircle rings may be tightly fitted through connectors or the like.

In an embodiment, as shown in FIG. 5, the steering driving device 522 may further include a rotation encoder 5224. An output shaft of the rotation encoder 5224 may be connected to the output shaft of the speed reducer via a transmission belt, so as to adjust a rotation rate of the output shaft of the speed reducer 52212. Therefore, a rotation angle of the steering wheel may be precisely controlled by using the rotation encoder 5224.

The rotation encoder 5224 may be configured to measure the speed of the output shaft of the speed reducer and cooperate with the PWM technology to achieve a rapid adjustment of the speed of the output shaft of the speed reducer. The rotation encoder 5224 may be implemented as a synchronous flange type encoder. It may be understood that the present disclosure does not limit the types of the rotation encoders 5224, and any type of encoders may be employed as desired in practice.

For example, the steering driving device 522 may further include a transfer assembly 5225, which may include two synchronous wheels and a transmission belt. One of the two synchronous wheels is connected to an output shaft of the rotation encoder 5224, and the other one of the two synchronous wheels is connected to the output shaft of the speed reducer 52212. The transmission belt is sleeved on the two synchronous wheels. In this way, the rotation rate of the speed reducer may be adjusted by controlling the rotation rate of the rotation encoder 5224. It may be understood that the structure of the transfer assembly 5225 in this embodiment is only illustrative to facilitate the understanding of the disclosure. According to different types of encoders, any structure of transmission assemblies may be employed, which are not limited in the present disclosure.

For example, the rotation encoder 5224 may be fixedly connected to the vehicle chassis through a fixing plate, or may be connected to the speed reducer fixed on the vehicle chassis through a fixing plate, so as to fix the position of the rotation encoder 5224.

In an embodiment, the rotation encoder 5224 may be, for example, disposed on the same side of the speed reducer 52212 as the motor 52211. In this way, in a case that the steering driving device is mounted on the vehicle chassis, the space occupied in the width direction of the vehicle chassis may be reduced, further facilitating the miniaturization design of the vehicle.

In an embodiment, the steering driving device 522 may further include two dust-proof elements 5226, which may have, for example, a structure like a shaft sleeve. The two dust-proof elements 5226 are sleeved on the two output terminals of the steering gear 5222, outside the two output terminals. For example, the two dust-proof elements 5226 may be respectively sleeved on the two output terminals which are respectively connected to two transmission bars 5223, outside the two output terminals.

It may be understood that the two dust-proof elements 5226 may be made of plastic materials or rubber materials, which is not limited in the present disclosure. With the dust-proof elements, it is possible to avoid an unstable articulation relationship between the output shaft and the transmission bar due to the influence of dirt and other impurities, thus improving a transmission efficiency of a driving force provided by the motor assembly and ensuring the stability of the steering driving of the steering wheel device by the steering driving device.

According to the embodiment of the present disclosure, the two output terminals of the steering gear 5222 may be, for example, provided with spherical grooves, to facilitate the articulation with the two transmission bars 5223, so as to cause the two transmission bars 5223 to slide relative to the steering gear in some extent. In this way, the flexibility of connection between the steering driving device and the steering wheel device may be improved to a certain extent, and the service life of the steering wheel device may be improved to a certain extent. Accordingly, the transmission bar may be a ball joint bar to achieve the articulation between the transmission bar and the steering gear.

The following describes a structure of the transmission bar by taking any one of the two transmission bars described previously as an example.

In an embodiment, the transmission bar 5223 may include a ball joint connector, a cross-bar and a corner joint. The ball joint connector includes a ball end and a non-ball end. The ball end of the ball joint connector is inserted into a spherical groove disposed at one of the two output terminals. The non-ball end of the ball joint connector is fixedly connected to the cross-bar. One end of the cross-bar may be provided with a groove, and the non-ball end of the ball joint connector is inserted into the groove of the cross-bar as a joint. For example, the side wall of the groove of the cross-bar may be provided with threads, and the non-ball end of the ball joint connector may further be provided with threads, so that the ball joint connector and may be engaged with the cross-bar through the threads. One end of the corner joint may be connected to the other end of the cross-bar opposite to one end of the cross-bar provided with groove, and the other end of the corner joint is fixedly connected to the steering wheel device 521.

For example, the other end of the cross-bar may be provided with a bump, and one end of the corner joint may be provided with a groove. A connection between the cross-bar and the corner joint may be achieved through a matching of the bump and the groove. The cross-bar and the corner joint may be connected by thread engagement or by any other methods, which is not limited in the present disclosure.

In an embodiment, the corner joint may be, for example, a right angle structure, to rotate the power provided by the steering gear by 90 degrees, so as to facilitate connection with the steering wheel device.

In an embodiment, the corner joint may include a first connector and a second connector that are vertically disposed with each other. One end of the first connector may be provided with a thread groove. In this way, a threaded connection between the first connector and the other end of the cross-bar may be achieved. The other end of the first connector may be, for example, provided with a spherical groove, and the second connector may be a ball joint connector. In this way, a ball end of the second connector may be inserted in the spherical groove, so as to achieve a hinged connection between the second connector and the first connector. In this way, the second connector may slide opposite to the first connector to a certain extent, thereby improving the flexibility of connection between the steering driving device and the steering wheel device to a certain extent, and improving the service life of the steering wheel device to a certain extent. The other end of the second connector corresponding to a ball head section may be configured as a joint to be fixedly connected to the steering wheel device. Specifically, it may be fixedly connected to one end of the corner joint in the steering wheel device described above.

In an embodiment, a gasket ring may further be disposed between the first connector and the second connector. In a case that the first connector is connected to the second connector, the gasket ring may be sleeved on a ball head of the second connector, and then an interference fit is performed between the ball head and the spherical groove of the first connector. With the gasket ring, the stability of the connection the two connectors may be improved.

According to the embodiment of the present disclosure, in configuring the steering system, the output shaft of the motor 52211 may be connected to the input shaft of the speed reducer 52212, and the output shaft of the speed reducer 52212 may be connected to one end of the coupling 52213. In addition, the rotation encoder 5224 may be connected to the output shaft of the speed reducer 52212 via a transmission element.

The other end of coupling 52213 is connected to an input terminal of steering gear 5222, and two output terminals of steering gear 5222 are respectively connected to two ball joint connectors included in two transmission bars. The ball joint connector is connected to the cross-bar, and the cross-bar is connected to the corner joint. The corner joint is fixedly connected to the corner joint 52121 in the steering wheel device 521. The ball joint connector is connected to the cross-bar, and the cross-bar is connected to the corner joint. The corner joint is fixedly connected to the corner joint 52121 in the steering wheel device 521.

Through the cooperation of the steering driving device and the steering wheel device, in a case that the motor 52211 is running, the output shaft of the speed reducer 52212 may be driven by the motor 52211 to rotate, and the output shaft of the speed reducer 52212 may drive an input terminal of the steering gear to rotate through the coupling 52213, thus driving the two output terminals of the steering gear to move in a direction perpendicular to the output shaft of the speed reducer 52212. The movement of the two output shafts may drive the two ball joint connectors to move, so as to cause the cross-bar to slide relative to the ball joint connectors as the cross-bar is driven by the ball joint connectors to move. The movement of the ball joint connector may drive the corner joint to move, providing the corner joint 52121 with a force perpendicular to the rotation direction of the steering wheel. In this way, the corner joint 52121 may transfer the force to the steering wheel, thereby changing the rotation direction of the steering wheel.

The combination of the steering driving device and the steering wheel device in the embodiment of the present disclosure may make the overall structure of the drive system smaller, facilitating the miniaturization and flattening design of the vehicle.

It may be understood that the connection between any two mechanical elements may be implemented by sleeving the gasket rings and other buffer elements, so as to improve the structural stability of the driving system. The ball head of the ball joint connector may be made of elastic materials such as rubber, etc., and a size of the ball head may be larger than the spherical groove, so as to achieve an interference fit between the ball head and the spherical groove, and ensure the stability of the connection between mechanical elements in the steering driving device.

The steering wheel device provided by the present disclosure will be described in detail below with reference to FIG. 6 to FIG. 8.

Figure 6:
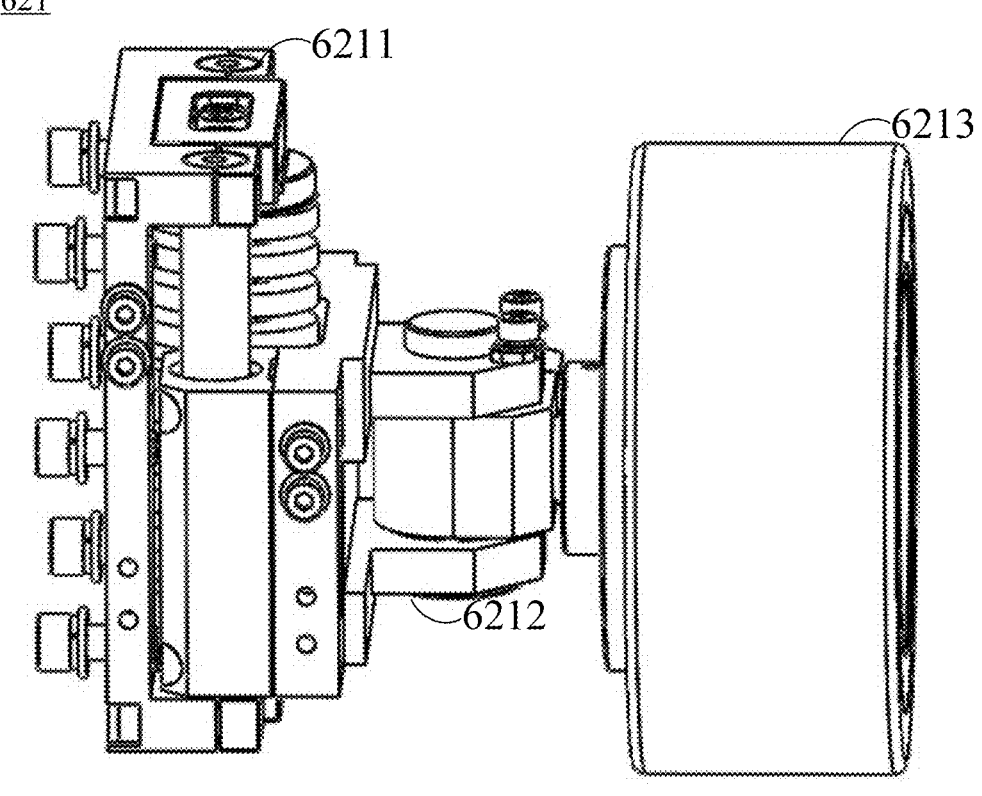
FIG. 6 is a structural diagram of a steering wheel device according to an embodiment of the present disclosure.

FIG. 6 is a structural diagram of a steering wheel device according to an embodiment of the present disclosure.

As shown in FIG. 6, the steering wheel device 621 of this embodiment may include a wheel suspension assembly 6211, a connecting assembly 6212, and a steering wheel assembly 6213. The connecting assembly 6212 includes the aforementioned corner joint, and the steering wheel assembly 6213 includes the aforementioned steering wheel hub and steering wheel.

The wheel suspension assembly 6211 may include a mounting support, a second elastic element, a second guide pillar, a first fixing block, etc. The wheel suspension assembly may have the structure described below, which will not be detailed here.

The connecting assembly 6212 is, for example, configured to articulate the wheel suspension assembly 6211 with the steering wheel assembly 6213, so that the steering wheel assembly 6213 may rotate relative to the wheel suspension assembly 6211 while the second elastic element in the wheel suspension assembly 6211 may be compressed or elongated under the driving of the steering wheel assembly 6213. For example, the connecting assembly 6212 may be fixedly connected to the second elastic element in the wheel suspension assembly 6211, so as to transfer the vertical force, which is applied to the connection assembly as the steering wheel assembly 6213 moves up and down, to the second elastic element.

The steering wheel assembly 6213 may include a steering wheel and a wheel hub. The steering wheel is sleeved on the wheel hub, and the connector may be rotationally connected to the steering wheel assembly through the wheel hub, so as to achieve a connection between the wheel suspension assembly and the steering wheel assembly.

In an embodiment, it is also possible to for example fixedly connect the connector to the steering driving device, so as to provide a steering force provided by the steering driving device to the steering wheel device, thereby causing the steering wheel device to change the rotation direction.

Figure 7:
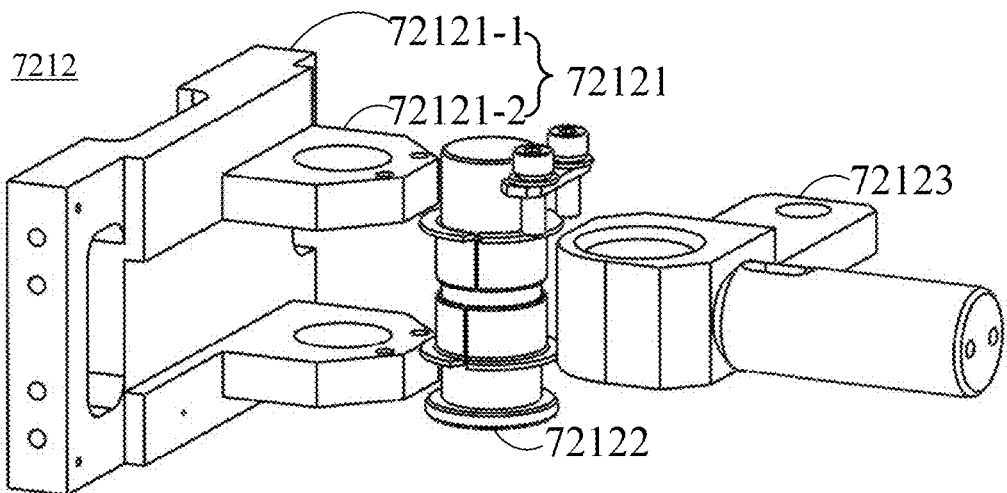
FIG. 7 is an exploded view of the structure of a connection assembly according to an embodiment of the present disclosure.

FIG. 7 is an exploded view of the structure of a connecting assembly according to an embodiment of the present disclosure.

As shown in FIG. 7, in an embodiment, the connecting assembly 7212 may include a support element 72121, a rotating shaft rod 72122, and a corner joint 72123. The support element 72121 is fixedly connected to the second elastic element in the wheel suspension assembly, the rotating shaft rod 72122 may be fixedly connected to the support element 72121, and the corner joint 72123 may be sleeved on the rotating shaft rod 72122 and rotationally connected to the steering wheel device. For example, the corner joint 72123 may rotate around a central axis of the rotating shaft rod 72122 under an external force. In this way, the steering wheel device may rotate relative to the corner joint 72123, and may provide the corner joint 72123 with a force in the vertical direction when bumping up and down. The force may be transferred to the second elastic element in the wheel suspension assembly through the rotating shaft rod 72122 and the support element 72121, so that the second elastic element is compressed or elongated. For example, it is also possible to fixedly connect the corner joint 72123 to the steering driving device. In this way, under an action of the steering force provided by the steering driving device, the corner joint 72123 may rotate around the central axis of the rotating shaft rod 72122, and provide a force perpendicular to the rotation direction to the steering wheel device, thereby changing the rotation direction of the steering wheel device.

In an embodiment, as shown in FIG. 7, the support element 72121 may include a support plate 72121-1 and two fixing plates 72121-2. The support plate 72121-1 is fixedly connected to the second elastic element. The two fixing plates 72121-2 may extend in a direction perpendicular to the support plate 72121-1, and the two fixing plates 72121-2 may be, for example, located on the same side of the support plate 72121-1 as the corner joint 72123.

In an embodiment, the two fixing plates 72121-2 may be provided with fixing holes, and the rotating shaft rod 72122 may be clamped in the fixing holes of the two fixing plates. For example, the rotating shaft rod 72122 has a rod structure, and both ends of the rod structure may be provided with external threads. The rotating shaft rod 72122 may be penetrated into the fixing holes of the two fixing plates and then the external threads at both ends of the rotating shaft rod 72122 are engaged with the fixing elements such as nuts, so as to achieve a fixed connection between the rotating shaft rod 72122 and the support element 72121.

For example, the rotating shaft rod 72122 may be constructed as a columnar structure, and two ends of the columnar structure are provided with external threads, so that the corner joint may rotate around the central axis of the rotating shaft rod 72122.

In an embodiment, when sleeving the corner joint 72123 on the rotating shaft rod 72122, a rotating bearing may be sleeved on an outside of the rotating shaft rod 72122 between the two fixing plates and. Then the corner joint 72123 may be sleeved on the outside of the rotating bearing. In this way, a friction coefficient of the corner joint 72123 rotating around the central axis of the rotating shaft rod 72122 may be reduced to a certain extent, and the rotation accuracy of the corner joint 72123 may be guaranteed.

In an embodiment, the corner joint 72123 may be, for example, an arc corner joint which has an arc corner. The arc corner joint may be provided with a through hole at the arc corner of the arc corner joint. In a case that the arc corner joint is rotationally connected to the rotating shaft rod, an arc corner part of the arc corner joint may be disposed between two fixing plates 72121-2, and the rotating shaft rod 72122 may be penetrated into the through hole at the arc corner. One end of the arc corner joint may be rotationally connected to the wheel hub, so as to cause the steering wheel to rotate around the arc corner joint. The other end of the arc corner joint is fixedly connected to the steering driving device, so as to cause the arc corner joint to be driven by the steering drive device to rotate around the central axis of the rotating shaft rod 72122, and apply a force perpendicular to the rotation direction of the wheel hub to the wheel hub through an end of the arc corner joint rotationally connected to the wheel hub, thereby changing the rotation direction of the steering wheel.

For example, the arc corner joint may include an arc corner block and two fixing rods which are perpendicular to each other. The two fixing rods are fixedly connected to the arc corner block. One of the two fixing rods is a cylindrical rod, which is rotationally connected to the wheel hub. The other one of the two fixing rods may be constructed as a plate structure, and the other one of the two fixing rod is fixedly connected to the steering driving device.

According to the embodiment of the present disclosure, a sensor may be provided for the steering wheel device to sense whether a vehicle including the steering wheel device is rolled. If the vehicle is rolled, the signal of being rolled may be sent to the control system of the vehicle to enable the control system to control the vehicle to brake or control the vehicle to power off, so as to avoid shortening the vehicle life, damaging the vehicle, and the like due to a long-term rolling.

In an embodiment, the steering wheel device includes a distance sensing assembly in addition to the wheel suspension assembly, the connecting assembly and the steering wheel assembly.

The distance sensing assembly may include a baffle, a sensor fixing element and a sensor. The baffle may be fixedly connected to the side wall of the first mounting plate included in the mounting support of the wheel suspension assembly. The sensor fixing element is fixedly connected to the side wall of the connector, and the sensor fixing element is disposed opposite to the baffle. The sensor is detachably connected to the connecting assembly via the sensor fixing element. The sensor may be, for example, a distance sensor.

In this way, in a case that the mounting support of the wheel suspension assembly is fixedly connected to the vehicle chassis, the mounting support of the wheel suspension assembly will move downward in the vertical direction with respect to the connector as the vehicle chassis sinks, when the vehicle is rolled, such that a distance between the baffle and the sensor is reduced. In a case that the sensor senses that the distance between the sensor and the baffle is less than a predetermined distance, for example, it may send a signal of being crushed to the control system of the vehicle, so as to cause the control system to control the vehicle to brake or power off.

Furthermore, by properly designing a height of the mounting support in the wheel suspension assembly, and by virtue of the connection relationship between the wheel suspension assembly and the connecting assembly and the connection relationship between the connecting assembly and the steering wheel device, the height of the vehicle chassis may be reduced when the vehicle is rolled, until the vehicle chassis contacts the ground. In this way, it is possible for the vehicle chassis to share the pressure on the steering wheel and the driving wheel of the vehicle, so as to prevent the steering wheel and the driving wheel from being damaged due to excessive pressure in some extent.

The structure of the wheel suspension assembly in the steering wheel device will be described in detail below with reference to FIG. 8.

Figure 8:
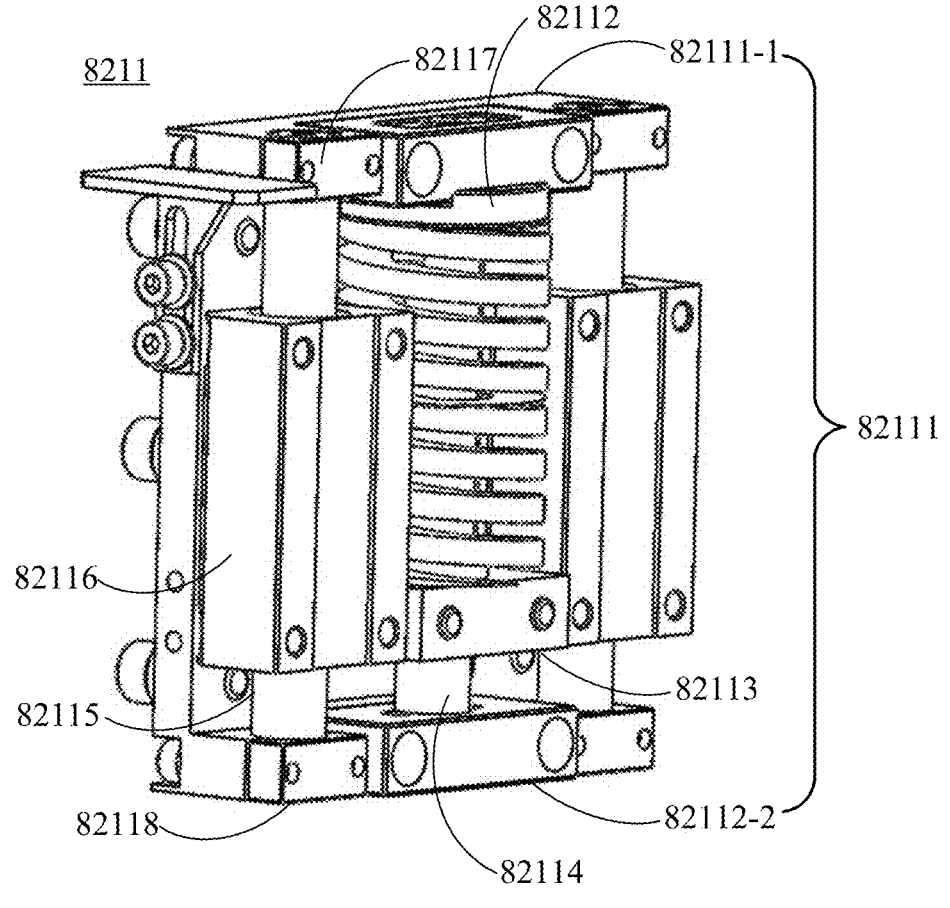
FIG. 8 is a structural diagram of a wheel suspension assembly according to an embodiment of the present disclosure.

FIG. 8 is a structural diagram of the wheel suspension assembly according to an embodiment of the present disclosure.

As shown in FIG. 8, the wheel suspension assembly 8211 of this embodiment may include a mounting support 82111, a second elastic element 82112, a second guide pillar 82113 and a first fixing block 82114.

The mounting support 82111 may be fixedly connected to the vehicle chassis, and the mounting support 82111 may include a first mounting plate 82111-1 and a second mounting plate 82111-2. The two mounting plates may be fixedly connected to the vehicle chassis through connectors, so that the wheel suspension assembly is fixed on the vehicle chassis.

Two ends of the second guide pillar 82113 are respectively fixed to the first mounting plate 82111-1 and the second mounting plate 82111-2. The second elastic element 82112 is sleeved on the second guide pillar 82113, and one end of the second elastic element 82112 is fixedly connected to the first mounting plate 82111-1. The first mounting plate 82111-1 is higher than the second mounting plate 82111-2 in the vertical direction. The first fixing block 82114 is sleeved on the second guide pillar 82113, and the first fixing block 82114 is configured to fix the other end of the second elastic element 82112.

For example, the first fixing block 82114 may be provided with a through hole. The size of the through hole is slightly larger than the size of the second guide pillar 82113, so as to ensure the first fixing block 82114 to move along the second guide pillar 82113. For example, the second elastic element 82112 may be connected to the connection element described above via the first fixing block 82114, so that the second elastic element is in a transmission connection with the steering wheel assembly.

When the steering wheel assembly moves up and down due to uneven ground, the steering wheel assembly may apply an upward force or a downward force to the connecting assembly, so that the connecting assembly drives the first fixing block to move along the second guide pillar, and thus the second elastic element is compressed or stretched. For example, when the steering wheel passes a convex hull on the ground, the second elastic element 82112 will be compressed. The second elastic element 82112 may provide the upward force to the vehicle chassis through the mounting support 82111, so as to maintain the distance between the vehicle chassis and the steering wheel as much as possible. When the steering wheel passes through a pit on the ground, the second elastic element 82112 will be elongated. The second elastic element 82112 may provide the downward force to the vehicle chassis through the mounting support 82111, so as to maintain the distance between the vehicle chassis and the steering wheel as much as possible. In this way, the adaptability of the vehicle to the ground may be improved. Moreover, with the second elastic element, the degree of vehicle bumping with uneven ground may be reduced to a certain extent, thereby achieving the shock absorption of the vehicle.

In an embodiment, it is also possible to provide a moving guide mechanism on both sides of the elastic element of the wheel suspension assembly, in order to avoid the offset of the steering wheel assembly with respect to the central position of the vehicle due to the offset of the second elastic element in the direction perpendicular to the central axis of the second guide pillar during the moving of the second elastic element. Therefore, with a mobile guiding mechanism, the stability of the vehicle during driving may be improved.

For example, as shown in FIG. 8, the wheel suspension assembly 8211 of this embodiment includes a third guide pillar 82115 and a sliding block 82116 in addition to the mounting support 82111, the second elastic element 82112, the second guide pillar 82113 and the first fixing block 82114.

Two ends of the third guide pillar 82115 are respectively fixedly connected to the first mounting plate 82111-1 and the second mounting plate 82111-2. The sliding block 82116 is sleeved on the third guide pillar 82115 and may slide along the third guide pillar 82115. For example, the sliding block 82116 is similar to the first fixing block described above and may be provided with a through hole. The third guide pillar 82115 penetrates the through hole and is fixedly connected to the first mounting plate 82111-1 and the second mounting plate 82111-2, so that the sliding block 82116 is disposed between the first mounting plate 82111-1 and the second mounting plate 82111-2.

The sliding block 82116 may be, for example, connected to the steering wheel assembly via the connector described above. In this way, the sliding block 82116 may be similar to the first fixing block. In the up and down movement of the steering wheel assembly, the sliding block 82116 may be driven by the connector to move along the third guide pillar 82115. That is, the sliding block 82116 may move synchronously with the first fixing block, thereby providing guidance for the movement of the first fixing block and the compression/elongation direction of the second elastic element.

In an embodiment, as shown in FIG. 8, the number of the third guide pillar 82115 and the number of the slider 82116 may both be two, and the two third guide pillars 82115 are respectively disposed on both sides of the second guide pillar 82113. The two sliding blocks are respectively sleeved on the two third guide pillars. In this way, the compression/elongation direction of the elastic element may be well limited.

In an embodiment it is also possible to set a natural length of the second elastic element, such that the elastic element may be elongated when the vehicle encounters a pit. In this way, providing the second elastic element effectively improves the adaptability of the vehicle to the ground. For example, the natural length of the second elastic element may be set less than a preset length. The preset length may be less than the difference between a distance between the first mounting plate and the second mounting plate and a height of the first fixing block. That is, in a case that the first fixing block is fitted with the second mounting block, the second elastic element is in a tensile state. It may be understood that the natural length of the second elastic element and an elastic coefficient of the second elastic element may be set as desired in practice. For example, the natural length of the second elastic element may be properly set, so that when the vehicle is rolled, the vehicle chassis may move downward until it contacts the ground.

In an embodiment, the wheel suspension assembly 8211 may further be provided with a locking element to lock the third guide pillar, in order to improve the connection stability between the third guide pillar and the mounting support.

For example, as shown in FIG. 8, the wheel suspension assembly 8211 of this embodiment includes a first locking element 82117 and a second locking element 82118 in addition to the mounting support 82111, the second elastic element 82112, the second guide pillar 82113, the first fixing block 82114, the third guide pillar 82115 and the sliding block 82116.

The first locking element 82117 may be detachably connected to the first mounting plate 82111-1. One end of the third guide pillar 82,115 may be clamped between the first locking element 82117 and the first mounting plate 82111-1. For example, the first mounting plate 82111-1 may be provided with a semi-cylindrical groove and a threaded hole, and the first locking element 82117 may further be provided with a semi-cylindrical groove and a threaded hole. In a case that the semi-cylindrical groove of the first locking element 82117 is aligned with and fixed on the semi-cylindrical groove of the first mounting plate 82111-1 through the connector, the third guide pillar 82115 may be fastened between the first locking element 82117 and the first mounting plate 82111-1.

Similarly, the second locking element 82118 may be detachably connected to the second mounting plate 82111-2. The other end of the third guide pillar 82115 is clamped between the second mounting plate 82111-2 and the second locking element 82118. A structure of the second locking element 82118 is similar to a structure of the first locking element 82117, and a structure of the first mounting plate 82111-1 is similar to a structure of the second mounting plate 82111-2, which will not be repeated here.

It may be understood that in a case that the number of the third guide pillar 82115 is two, the number of the second locking elements 82118 and the number of the first locking elements 82117 may both be two.

It may be understood that in order to avoid the impact on the mounting frame when moving, elements such as gasket rings may be disposed on a side of the first mounting plate and on a side of the second mounting plate, which is opposite to the side of the first mounting plate, at positions where the first guide pillar and the second guide pillar are fixed.

According to the embodiment of the present disclosure, the steering wheel device may achieve, for example, the braking according to a drum brake principle. The following will describe in detail the structure of the steering wheel device by using the drum brake principle to achieve to brake with reference to FIG. 9.

Figure 9:
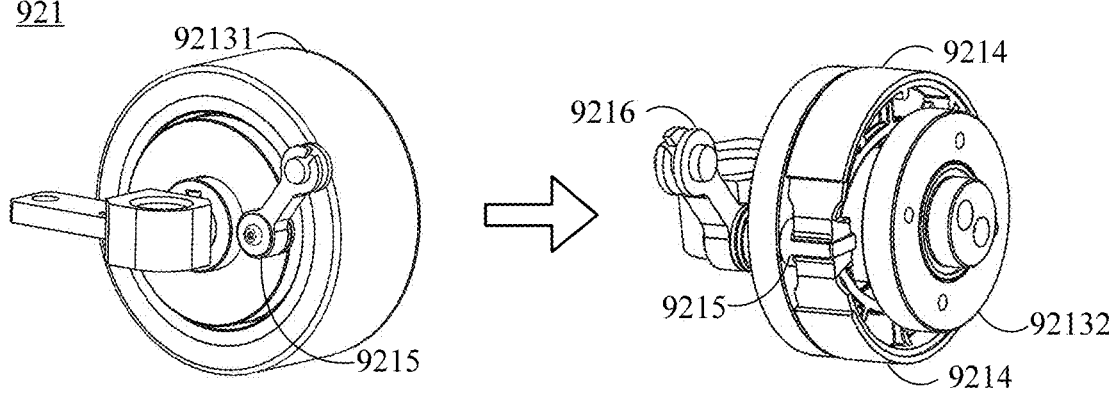
FIG. 9 is a structural diagram of a steering wheel device according to another embodiment of the present disclosure.

FIG. 9 is a structural diagram of a steering wheel device according to another embodiment of the present disclosure.

As shown in FIG. 9, the steering wheel device 921 of this embodiment may further include two first drum brake pads 9214, a first rotating shaft 9215, a first fixing shaft and a first pulling rod 9216.

Two first drum brake pads 9214 may be opposite to each other, and are disposed between the steering wheel 92131 and the steering wheel hub 92132. The steering wheel hub 92132 is clamped in a space enclosed by two first drum brake pads 9214, and the steering wheel 92131 is sleeved on the periphery of each of the two first drum brake pads 9214. The first rotating shaft 9215 and the first fixing shaft are clamped between the two first drum brake pads 9214. For example, the first rotating shaft 9215 is clamped between a first end of one of the two first drum brake pads and a first end, which is close to the first end of one of the two first drum brake pads 9214, of the other one of the two first drum brake pads. The first fixing shaft is clamped between a second end of one of the two first drum brake pads and a second end, which is close to the second end of one of the two first drum brake pads, of the other one of the two first drum brake pads. It may be understood that although the position of the first fixing shaft is not shown in FIG. 9, the first fixing shaft and the first rotating shaft 9215 are symmetrically disposed relative to the central axis of the steering wheel hub 92132.

In an embodiment, the steering wheel 92131 may include a tire, a rim and a spoke. A part of the steering wheel hub 92132 protruding from the two drum brake pads may be fixedly connected to the spoke to drive the steering wheel 92131 to rotate.

The first pulling rod 9216 is fixedly connected to the first rotating shaft 9215, and is fixedly connected to a brake line of the vehicle. In this way, when the brake line is tensioned, the brake line may drive the first pulling rod 9216 and the first rotating shaft 9215 to rotate. By rotating the first rotating shaft 9215, for example, the two first drum brake pads may be pushed, so that the space between the two first ends of the two first drum brake pads increases, thereby increasing the friction between the two first drum brake pads and the steering wheel. On the contrary, in a case that the brake line is released, the first pulling rod 9216 and the first rotating shaft 9215 are driven by the brake line to rotate, so as to reduce the distance between the two first ends of the two first drum brake pads, thereby reducing the friction between the two first drum brake pads and the steering wheel 92131.

In an embodiment, the first rotating shaft 9215 is clamped between two first drum brake pads 9214, and has different dimensions in different directions. In mounting the first rotating shaft 9215 and the first pulling rod 9216, the brake line in a released state may be fixedly connected to the first pulling rod 9216, and the two surfaces of the first rotating shaft 9215 perpendicular to the direction of smaller dimensions may be respectively contacted to the two first ends. In this way, in a case that the brake line is tensioned, the first rotating shaft 9215 is driven to rotate, such that the distance between the two first ends may be increased.

The embodiment of the present disclosure may achieve the braking of the driving wheel in a narrow space by using the structure of the aforementioned drum brake pads, the rotating shaft and the pulling rod as described above. In this way, a space required by the driving system with braking function may be effectively reduced, facilitating the miniaturization and flattening design of the test target vehicle.

The driving system included in the vehicle chassis will be described in detail below with reference to FIG. 10.

Figure 10:
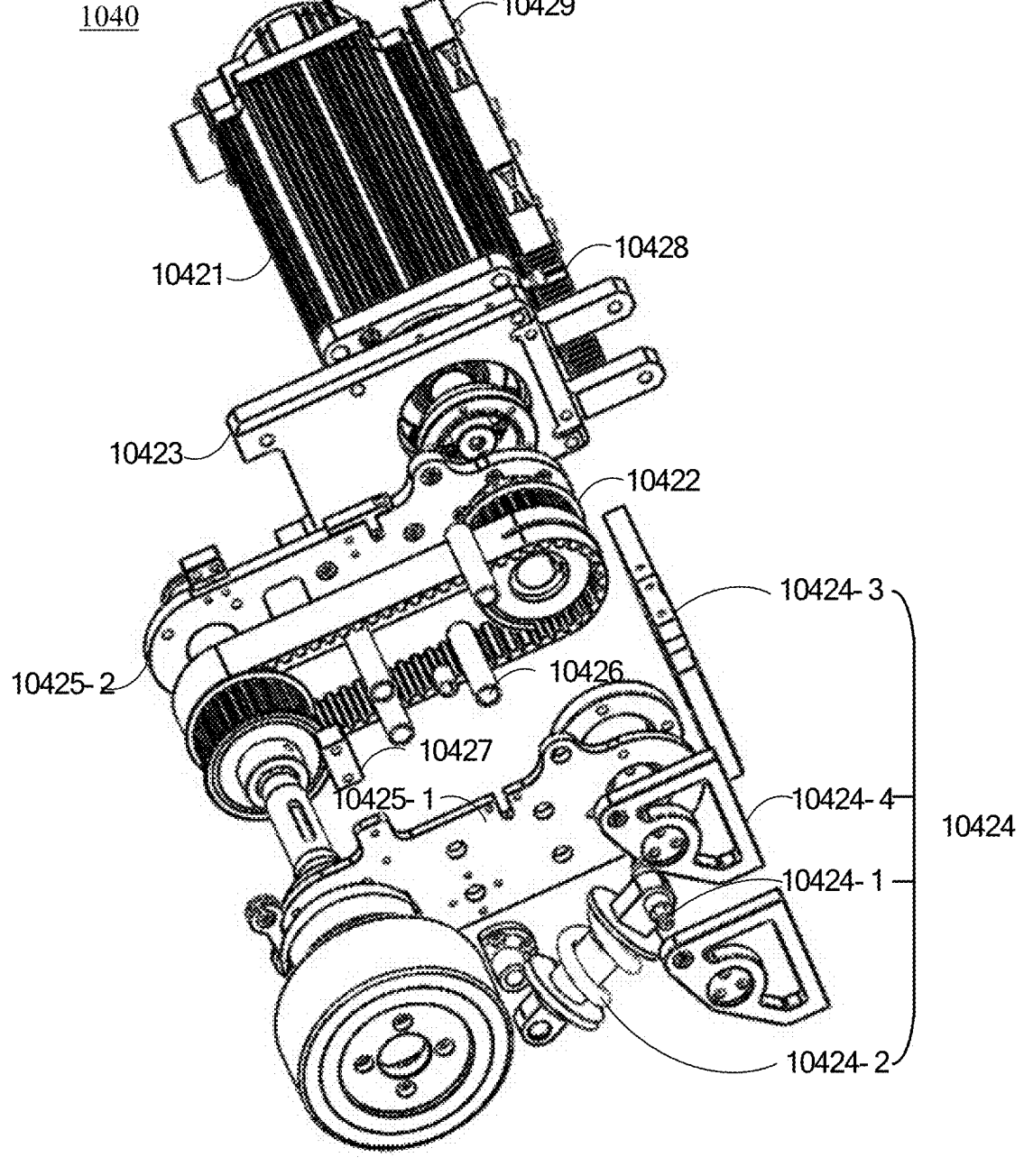
FIG. 10 is a structural diagram of a driving system according to an embodiment of the present disclosure.

FIG. 10 is a structural diagram of a driving system according to an embodiment of the present disclosure.

As shown in FIG. 10, the driving system 1040 of the embodiment includes a driving wheel device and a driving device, and the driving device is connected to the driving wheel device.

In an embodiment, the driving wheel device may include a driving wheel hub and a driving wheel, and the driving device may include a driving motor. In this embodiment, an output shaft of the driving motor may be fixedly connected to the driving wheel hub. In this way, when the driving motor is running, the output shaft of the driving motor may drive the driving wheel hub to rotate, so that the driving wheel hub may drive the driving wheel to rotate. For example, the driving wheel may be sleeved on the driving wheel hub and fixedly connected to the driving wheel hub.

In an embodiment, the driving device may include a speed reducer in addition to the driving motor, for example, to match the speed and transmit torque between the driving motor and the driving wheel hub. In this case, an input shaft of the speed reducer is connected to an output shaft of the driving motor, and an output shaft of the speed reducer is connected to the driving wheel hub.

As shown in FIG. 10, the driving device of the vehicle may include a driving motor 10421, a power transfer assembly 10422, a third mounting plate 10423, and a damping assembly 10424.

According to the embodiment of the present disclosure, the driving motor 10421 may be a permanent magnet DC servo motor, a permanent magnet wound disk DC motor, a permanent magnet brushless DC servo motor, or the like. According to actual requirements, the driving motor 10421 may be any type of motor.

According to the embodiment of the present disclosure, the power transfer assembly 10422 is connected to the output shaft of the driving motor, that is, the driving wheel hub of the vehicle, and the power transfer assembly 10422 may transfer the power provided by the driving motor to the driving wheel hub so as to drive the driving wheel to rotate.

In an embodiment, the power transfer assembly 10422 may include a coupling, and both ends of the coupling are respectively connected to the output shaft of the driving motor and the driving wheel hub.

In another embodiment, the power transfer assembly 10422 may constructed as a structure including a synchronous wheel in combination with a transmission belt. In this embodiment, at least two synchronous wheels are provided. One of the at least two synchronous wheels is connected to an output shaft of the motor, and the other one of the at least two synchronous wheels is connected to the wheel hub. The at least two synchronous wheels rotate approximately synchronously under the transmission action of a synchronous belt. It may be understood that in FIG. 10, the power transfer assembly 10422 is represented as a structure including a synchronous wheel in combination with a transmission belt, but the structure of the power transfer assembly 10422 is only illustrative to facilitate understanding of the present disclosure, which is not limited in the present disclosure.

According to the embodiment of the present disclosure, the third mounting plate 10423 may be configured to mount the driving motor 10421 on the chassis support. Specifically, the driving motor 10421 may be mounted at the motor mounting site in the driving system mounting site of the chassis support via the third mounting plate 10423. For example, the third mounting plate 10423 may be connected to the side plate of the chassis support by connectors such as screws and nuts.

According to the embodiment of the present disclosure, as shown in FIG. 10, the damping assembly 10424 may include, for example, a rotation shaft 10424-1 fixedly connected to the third mounting plate 10423 and a rotating arm 10424-2 connected to the rotation shaft 10424-1, and the rotating arm 10424-2 may rotate by taking the rotation shaft 10424-1 as an axis of rotation.

A extension direction of the rotating shaft 10424-1 may be perpendicular to a direction in which the power transfer assembly 10422 drives the driving wheel to rotate. In this way, in a case that the driving wheel bumps up and down due to bumpy road surface, since the third mounting plate 10423 is connected to the chassis support and the rotating shaft 10424-1 is connected to the third mounting plate 10423, the bumping of the vehicle chassis with the driving wheel may be alleviated through the rotation of the rotating arm 10424-2 relative to the rotation shaft 10424-1. That is, the driving device of the embodiment of the present disclosure may be used to reduce the degree of body flutter caused by uneven road surface during vehicle driving, thereby bringing shock absorption effect to the vehicle.

In an embodiment, the power transfer assembly 10422 may include two synchronous wheels and a conveyor belt. Two synchronous wheels are arranged in a horizontal direction perpendicular to the output shaft of the driving motor. One of the two synchronous wheels is connected to the output shaft of the driving motor, and the other one of the two synchronous wheels is connected to the driving wheel hub.

In an embodiment, the other one of the two synchronous wheels may be connected to the driving wheel hub through the transmission bearing, so as to increase the connection stability, reduce the friction coefficient in the transmission process, and ensure the rotation accuracy. Specifically, an axle of the other one of the two synchronous wheels is connected to the driving bearing, and the driving wheel hub is sleeved on the driving bearing, so as to achieve the connection between the other one of the two synchronous wheels and the driving wheel hub.

According to the embodiment of the present disclosure, the conveyor belt may be sleeved on two synchronous wheels. In this way, in a case that one of the two synchronous wheels is driven by the output shaft of the driving motor to rotate, one of the two synchronous wheels may drive the other one of the two synchronous wheels to rotate through the conveyor belt by the friction between the conveyor belt and one of the two synchronous wheels, so that the other one of the two synchronous wheels may drive the driving wheel to rotate.

According to the embodiment of the present disclosure, as shown in FIG. 10, in this embodiment, the driving device of the vehicle may further include a fourth mounting plate, which may include a mounting plate 10425-1 and a mounting plate 10425-2. The mounting plate 10425-2 is disposed close to the driving motor, and the mounting plate 10425-1 is disposed close to the shock absorber assembly and the driving wheel. The power transfer assembly 10422 is clamped between the mounting plate 10425-1 and the mounting plate 10425-2. The mounting plate 10425-1 and the mounting plate 10425-2 may be provided with locating holes to locate the mounting sites of transmission bearings, connectors, etc. The mounting plate 10425-1 and the mounting plate 10425-2 may be connected via a plurality of connectors 10426, so that the power transfer assembly 10422 is firmly clamped between the two mounting plates. The connector 10426 may be, for example, a shaft sleeve, etc., which is not limited in the present disclosure.

According to the embodiment of the present disclosure, as shown in FIG. 10, the driving device may further include a brake line fixing clip 10427, which is configured to fix the second brake line in the second brake system, so as to avoid additional friction caused by the chaotic wiring of the brake line to the power transmission. The brake line fixing clip 10427 may be, for example, mounted on the mounting plate 10425-1, and the mounting site shall ensure no contact with the transmission belt. Through the brake line fixing clip 10427, for example, the brake line may be routed close to the mounting plate 10425-1 to avoid contact between the brake line and the synchronous wheels, and contact between the brake line and the conveyor belt.

According to the embodiment of the present disclosure, an elastic element may be used as a rotating arm to further improve the damping effect.

For example, as shown in FIG. 10, the rotating arm may include an elastic element such as a spring, etc. The rotating shaft may include two shafts, which are located at different positions in the direction perpendicular to the output shaft of the driving motor. Two ends of the elastic element are respectively connected to the two shafts, and the two shafts may be taken as rotating shafts to rotate. For example, both of the two shafts may be fixedly connected to the third mounting plate. In this way, in a case that the wheels bump up and down, the elastic elements may be compressed or stretched through the rotation of the elastic elements around two shafts, so as to increase the force applied by the damping assembly 10424 on the vehicle frame and improve the damping effect. At the same time, after the wheels stop bumping, the spacing between the frame and the wheels may be restored to the value before the bumping under the effect of the elasticity of the elastic elements, which is convenient for shock absorption during subsequent driving.

In an embodiment, if the power transfer assembly 10422 includes two synchronous wheels, one of the two shafts may be close to the synchronous wheel connected to the driving wheel hub in the two synchronous wheels, and the other one of the two shafts may be close to the synchronous wheel connected to the output shaft of the driving motor in the two synchronous wheels. In the above two shafts, in a case that the power transfer assembly 10422 is connected to the driving wheel hub, one shaft close to the driving wheel hub is disposed at a position lower than the position at which the other shaft away from the driving wheel hub is disposed. In this way, in a case that the driving wheel moves to the bump on the ground, one end of the elastic element close to the driving wheel is lifted, and both ends of the elastic element may rotate along two drafts, so that the elastic element is compressed and the length of the elastic element is shortened. In a rotation process of the elastic element around the other draft, the force applied by the elastic element on the other draft includes a downward force perpendicular to the ground. The downward force perpendicular to the ground may be applied on the chassis support via the first mounting plate, so as to apply resistance for the chassis support with the bump of the driving wheel, reduce the bump degree of the chassis support, and achieve shock absorption. On the contrary, in a case that the driving wheel moves to the depression on the ground, the elastic element is stretched. In a case that the elastic element rotates around the other draft, the force applied by the elastic element on the other draft includes an upward force perpendicular to the ground. The upward force perpendicular to the ground may be applied on the chassis support via the third mounting plate, so as to apply resistance for the chassis support with the bump of the driving wheel, reduce the bump degree of the chassis support, and achieve shock absorption.

In an embodiment, both ends of the elastic element may have a circular hook structure, and the elastic element is connected to two shafts through the circular hook structure. Alternatively, the elastic element may be sleeved on two connecting rods, that is, the rotating arm further includes the two connecting rods. The two connecting rods are constructed as hollow structures. Among the two connecting rods, an outer diameter of one connecting rod matches an inner diameter of the other connecting rod, and one end of the other connecting rod is sleeved on a periphery of the one connecting rod. Each of the two connecting rods has the other end being provided with a through hole perpendicular to a length direction of the connecting rod, in order to be passed through by respective one of the two shafts. In this way, when the rotating arm is rotating around two shafts, an overlapping area of the two connecting rods is increased to lengthen the elastic element or decreased to compress the elastic element.

In an embodiment, as shown in FIG. 10, the damping assembly of the embodiment may further include a fixing element in addition to an elastic element. The fixing element may include a first fixing plate 10424-3 fixedly connected to the third mounting plate 10423 and disposed perpendicular to the third mounting plate 10423, and two second fixing plates 10424-4 parallel to the first fixing plate and arranged in a direction of the output shaft of the motor. The two second fixing plates 10424-4 are connected to the first fixing plate 10424-3. Another shaft included in the rotating shaft may be clamped between the two second fixing plates. One of the shafts included in the rotating shaft is fixedly connected to the mounting plate 10425-1. For example, the damping assembly may further include a support, through which one of the shafts may be fixedly connected to the mounting plate 10425-1.

This embodiment may improve the stability of the shock absorber assembly by disposing the shock absorber assembly of the first fixing plate and the shock absorber assembly of the second fixing plate. Compared with a way of fixedly connecting the two shafts to the third mounting plate, it may increase the degree that the elastic elements are compressed or stretched with the wheel bumps, because the position of one of the shafts is affected by the driving wheel, and the position of the other one of the shafts is affected by the frame. In this way, the damping effect may be effectively improved.

According to the embodiment of the present disclosure, the driving device of the vehicle may further be provided with a cooling fan to cool the motor and improve the service life and operation stability of the driving device of the vehicle. As shown in FIG. 10, in this embodiment, the driving device 1040 includes a cooling fan 10428 and a fan holder 10429 in addition to the driving motor 10421, a power transfer assembly 10422, the third mounting plate 10423 and the damping assembly 10424.

The cooling fan 10428 and the driving wheel device may be disposed on different sides of the driving motor 10421. That is, the cooling fan is disposed at a side of the driving motor 10421 away from the wheel. The cooling fan 10428 may be disposed close to the driving motor 10421 to improve the heat dissipation efficiency.

The fan holder 10429 may be configured to mount the cooling fan 10428 on the chassis support. It is also possible to fixedly connect the fan holder 10429 to the third mounting plate 10423 and provide, for example, a heat sink in an area of the fan holder 10429 near the driving motor 10421, in order to improve the heat dissipation efficiency and uniformity.

For example, a number of cooling fans 10428 may be selected as desired in practice. For example, the cooling fan 10428 may achieve for heat dissipation by air cooling or liquid cooling, and the type of cooling fan may be selected as desired in practice, which is not limited in this disclosure.

In an embodiment, the driving wheel device may include a driving wheel, a driving wheel hub, two second drum brake pads, a second rotating shaft, a second fixing shaft, and a second pulling rod. It may be understood that the structure of the second drum brake pad, the second rotating shaft, the second fixing shaft and the second pulling rod may be similar to the structure of the first drum brake pad, the first rotating shaft, the first fixing shaft and the first pulling rod described above.

Two second drum brake pads are opposite to each other, and are disposed between the driving wheel and the driving wheel hub. Specifically, a driving wheel is clamped in a space enclosed by two second drum brake pads, and the driving wheel sleeves on a periphery of the two second drum brake pads.

In an embodiment, the driving wheel may include a tire, a rim and a spoke. A part of the driving wheel hub protruding from two second drum brake pads may be fixedly connected to the spoke to drive the driving wheel to rotate.

The second rotating shaft and the second fixing shaft are configured to fix the two second drum brake pads, so that the two second drum brake pads may be fixed together. Specifically, the second rotating shaft may be clamped at the first ends of two second drum brake pads, and the first ends of the two first drum brake pads are close to each other. The second fixing shaft may be clamped at the second ends of two drum brake pads, and the second ends of the two drum brake pads are close to each other.

The second pulling rod is fixedly connected to the second rotating shaft. The second pulling rod is also fixedly connected to the second brake line in the second brake system. In this way, in a case that the second brake line is tensioned, the brake line may drive the second pulling rod and the second rotating shaft to rotate. By rotating the second rotating shaft, for example, the two second drum brake pads may be pushed, so that the distance between the two first ends of the two second drum brake pads is increased, thereby increasing the friction between the two second drum brake pads and the driving wheel. On the contrary, in a case that the second brake line is released, the second brake line drives the second pulling rod and the second rotating shaft to rotate, so as to reduce the distance between the two first ends of the two second drum brake pads, thereby reducing the friction between the two second drum brake pads and the driving wheel.

In an embodiment, dimensions of a part of the second rotating shaft clamped between two drum brake pads in different directions may be different. In a case that the second rotating shaft and the second pulling rod are mounted, the second brake line in the released state may be fixedly connected to the second pulling rod, and two surfaces of the second rotating shaft perpendicular to the direction with smaller size may be respectively contacted with two first ends. In this way, in a case that the second brake line is tensioned, the distance between the two first ends may be increased by driving the second rotating shaft to rotate.

The embodiment of the present disclosure may achieve the braking of the driving wheel in a narrow space by using the structure of the aforementioned drum brake pad, the rotating shaft and the pulling rod. In this way, the space required by the driving system with braking function may be effectively reduced, facilitating the miniaturization and flattening design of the test target vehicle.

The structure of any one of the first brake system and the second brake system included in the vehicle chassis will be described in detail below with reference to FIG. 11.

Figure 11:
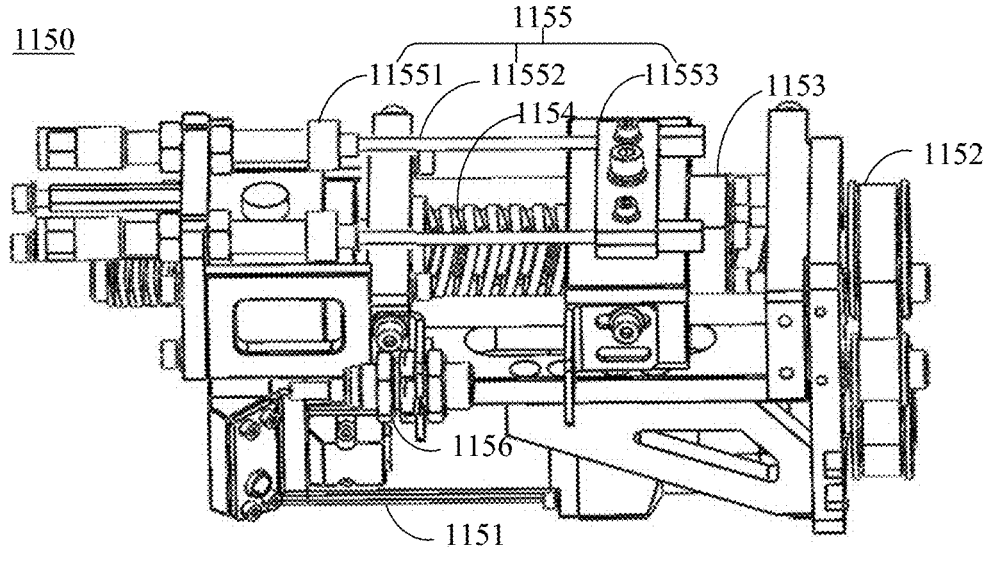
FIG. 11 is a structural diagram of a brake system according to an embodiment of the present disclosure.

FIG. 11 is a structural diagram of a brake system according to an embodiment of the present disclosure.

As shown in FIG. 11, the brake system 1150 of this embodiment may include a power assembly 1151, a power transfer assembly 1152, a translation assembly 1153, a force accumulation assembly 1154 and a brake assembly 1155.

The power assembly 1151 may be, for example, a brake motor. The power transfer assembly 1152 is connected to an output shaft of the power assembly 1151, which may be specifically connected to an output shaft of the brake motor. The power transfer assembly 1152 may be, for example, an assembly that converts rotation of the output shaft of the brake motor into translation. For example, the power transfer assembly 1152 may be a crank slider assembly, a gear rack assembly, a crank slider mechanism, and the like, which is not limited in the present disclosure.

The translation assembly 1153 is connected to the power transfer assembly 1152, and the translation assembly 1153 may be any mechanical element that may move under the thrust, which is not limited in this disclosure.

The force accumulation assembly 1154 may be, for example, a mechanical element such as an elastic element that may be compressed under the action of thrust and may automatically recover to the original length after the thrust disappears. In this way, the force accumulation assembly is to be pushed by the translation assembly to store energy.

The brake assembly 1155 may include, for example, a brake line, which is connected to the translation assembly 1153 and the driving wheel device/the steering wheel device, and is tensioned or released by the translation assembly 1153. For example, one end of the brake line may be fixed on the translation assembly 1153, and the other end of the brake line may be fixed on the driving wheel device/ the steering wheel device described above. Specifically, the other end of the brake line is connected to the pulling rod on the driving wheel device/the steering wheel device described above.

For example, in a case that the translation assembly 1153 moves in a first direction and the force accumulation assembly 1154 is compressed, the brake line may be released. In a case that the energy stored in the force accumulation assembly 1154 is released, the translation assembly moves in a second direction, so as to tighten the brake line and drive the pulling rod to rotate. In this way, the space between the two second drum brake pads/the two first drum brake pads described above may be increased, and the friction between the second drum brake pad/the first drum brake pad and an inner surface of the tire of the wheel device to which the second drum brake pad/the first drum brake pad belongs may be increased to provide resistance for the rotation of the drive wheel/the steering wheel.

For example, by controlling the power assembly, the thrust applied by the power transfer assembly for the translation assembly may be balanced with the force applied by the energy storage assembly to the translation assembly, so as to control the force accumulation assembly to maintain the state of stored energy. In a case that the vehicle is powered off, the thrust provided by the power transfer assembly for the translation assembly disappears due to the power failure of the power assembly. The translation assembly may move in a second direction under the action of the force applied by the force accumulation assembly, so that the brake line may be tightened. Therefore, in this embodiment, the force accumulation assembly may release energy in a case that the vehicle is powered off, so that the brake element is tensioned and drives the first drum brake pad/the second drum brake pad to apply force to the steering wheel/the driving wheel. Therefore, the vehicle provided with the brake system of the embodiment may automatically brake when the power is cut off, so as to avoid a potential safety hazard caused by continuously driving due to an inertia of the vehicle when the power is cut off.

In view of the above, the brake system of the vehicle in the embodiment of the present disclosure may effectively improve the safety of vehicle driving through the disposing of the force accumulation assembly, which is conducive to accelerating the efficiency of vehicle automatic driving in the market.

In an embodiment, the power transfer assembly may include, for example, a screw rod nut device, and one end of the screw rod may be connected to the output shaft of the power assembly. The nut fits with the screw rod. In a case that the screw rod is driven by the power element to rotate, the nut may move on the screw rod. The translation element may be sleeved on the screw rod and located at the other end close to the screw rod with respect to the nut. In this way, in a case that the nut moves to the other end of the screw rod, it may push the translation element to move.

In an embodiment, the power transfer assembly may be constructed as an structure of the synchronous wheel and the transmission belt so as to achieve the power transferring. In this way, the translation assembly and the force accumulation assembly may be disposed on a side of the power assembly along a height direction, so as to reduce the size of the overall structure of the brake system in the horizontal direction, thereby facilitating the miniaturization design of the vehicle chassis and the vehicle.

As shown in FIG. 11, the power transfer assembly 1152 of the embodiment may include two synchronous wheels, a transmission belt, a screw rod, a nut and a rotating block.

One of the two synchronous wheels may be connected to an output shaft of power assembly 1151, so that the one of the two synchronous wheels is driven by the power assembly 1151 to rotate. The other one of the two synchronous wheels is fixedly connected to one end of the screw rod, and the transmission belt is sleeved on the two synchronous wheels. In this way, as one of the synchronous wheels is driven by the power assembly 1151 to rotate, the one of the synchronous wheels drives the other one of the two synchronous wheels to rotate through the transmission belt, so that the other one of the two synchronous wheels may drive the screw rod to rotate. In this way, the nut on the screw rod may move relative to the screw rod in a length direction of the screw rod.

The other end of the screw rod is fixedly connected to the rotating block. The aforementioned translation assembly 1153 and the force accumulation assembly 1154 may be sleeved on the screw rod in sequence in a direction of leaving the other one of the two synchronous wheels. The nut may be fixedly connected to the translation element through a connector such as a screw. In this way, the rotating block may limit a position of the force accumulation assembly 1154. In a case that the nut moves toward the other end of the screw rod in the length direction of the screw rod, the translation assembly 1153 may be pushed to move, and the force accumulation assembly 1154 may be compressed, so as to cause the force accumulation assembly 1154 to store energy.

In an embodiment, as shown in FIG. 11, the power transfer assembly 1152 may further include a fixing plate, and two synchronous wheels may be fixed on the fixing plate through a connection element such as a screw. The fixing plate may be fixedly connected to the chassis support in the vehicle chassis, so that the translation assembly 1153 and the force accumulation assembly 1154 may be fixed on a side of the power assembly 1151 along the height direction.

In an embodiment, the power transfer assembly 1152 may further include, for example, two tensioning wheels. The two tensioning wheels may be fixed on the fixing plate and disposed between the two synchronous wheels in the height direction. The two tensioning wheels are symmetrically disposed with respect to a connecting direction of the rotating shafts of the two synchronous wheels, and both of them press against the transmission belt, so as to cause the transmission belt to be disposed between the two tensioning wheels. By disposing the two tensioning wheels, the driving belt may be kept in a tensioned state. Thus, it may avoid the situation of loose transmission belt and unstable braking effect caused by too long running time.

According to the embodiment of the present disclosure, an electromagnet may be disposed in the force accumulation assembly. The electromagnet generates magnetic force when it is energized, and prevents the rotation of the rotating block through suction, thereby limiting the position of the nut on the screw rod. In this way, the force accumulation assembly may maintain the state of storing energy without the power provided by the power assembly. In a case that the power is cut off, because the electromagnet loses its magnetic force, the force accumulation assembly may release energy and push the translation assembly and the nut to move, so as to cause the rotating block to rotate, and cause the brake assembly to be connected to the translation assembly tightened. The rotating block may have, for example, a ferromagnetic material, to stop rotating under the action of electromagnet suction in a case that electromagnet generates magnetic force. Correspondingly, the force accumulation assembly may further include an elastic element which is sleeved on the screw rod.

In addition, in order to better limit the position of the elastic element and ensure the stability of stored energy, the force accumulation assembly in the embodiment may further be provided with a first fixing base. One end of the elastic element is fixedly connected to the first fixing base, and the other end of the elastic element is fixedly connected to the translation assembly.

As shown in FIG. 11, the force accumulation assembly 1154 of the embodiment may include a third elastic element, a first fixing base and an electromagnet.

The third elastic element is sleeved on the screw rod. One end of the third elastic element is fixedly connected to the translation assembly 1153, and the other end of the third elastic element is fixedly connected to the first fixing base.

For example, the first fixing base may be provided with a through hole, through which the screw rod is fixedly connected to the rotating block. In this embodiment, it is possible to provide, for example, a base plate between the power assembly 1151, the translation assembly 1153, and the force accumulation assembly 1154, and fixedly connect the base plate to the chassis support of the vehicle chassis. The first fixing base of the embodiment may be fixed on the base plate to improve the stability of the overall structure.

The electromagnet may be disposed at a side of the rotating block away from the first fixing base. That is, the rotating block is disposed between the electromagnet and the first fixing base, so that a suction force provided by the electromagnet is opposite to the direction of the elastic force provided to the translation assembly 1153 in a case that the third elastic element is compressed. For example, the electromagnet may be, for example, fixedly connected to the base plate described above or the chassis support of the vehicle chassis in any way. The electromagnet shall be fixed on the same side of the power assembly with the rotating block. The electromagnet may, in a case that the power is on, attract the rotating block, and in a case that the power is off, release the rotary block.

In an embodiment, the force accumulation assembly may be provided with a moving shaft for the electromagnet. The electromagnet may move along the moving shaft. In this way, in a case that the electromagnet is energized, the electromagnet may move along the moving shaft close to the rotating shaft and attract the rotating shaft. That is, the electromagnet may, in a case that the power is on, hold the rotating block, and in a case that the power is off, release the rotating block.

According to the embodiment of the present disclosure, the force accumulation assembly may further be provided with a second fixing base and a fourth elastic element, which provides a force away from the rotating block for the electromagnet, so as to avoid resistance to the rotation of the rotating block due to an excessive small distance between the electromagnet and the rotating block in a case that braking is required.

As shown in FIG. 11, the force accumulation assembly 1154 of this embodiment may include, for example, a second fixing base, a fourth guide pillar and a fourth elastic element, in addition to the third elastic element, the first fixing base and the electromagnet.

The second fixing base is disposed at a side of the electromagnet away from the rotating block. One end of the fourth guide pillar passes through the second fixing base and is fixedly connected to the electromagnet. The fourth elastic element is sleeved on the fourth guide pillar. For example, one end of the fourth elastic element is fixedly connected to the second fixing base, and the other end of the fourth elastic element is butted with the other end of the fourth guide pillar away from the electromagnet. For example, the second fixing base may be provided with a through hole, and the fourth guide pillar passes through the second fixing base through the through hole.

In an embodiment, in a case that the electromagnet is energized, the fourth elastic element is in a compressed state. In this way, in a case of power failure, the fourth elastic element may apply a force on the other end of the fourth guide pillar, so as to cause the fourth guide pillar to drive the electromagnet to move in a direction of approaching the second fixing base until the electromagnet fits with the second fixing base. In an embodiment, in a case that the electromagnet fits the second fixing base, the distance between the second fixing base and the other end of the fourth guide pillar may be less than or equal to a natural length of the fourth elastic element. In order to ensure a stable fit between the electromagnet and the second fixing base in the case of power failure, the distance between the second fixing base and the other end of the fourth guide pillar may be less than the natural length of the fourth elastic element even when the electromagnet is fitted with the second fixing base, th.

In an embodiment, in order to facilitate the movement of the electromagnet along a length direction of the fourth guide pillar, the force accumulation assembly 1154 may be configured to have two side plates, which are fixedly connected to the first fixing base. The second fixing base may fix the mounting site through the fixing connection with the two side plates. The two side plates may be disposed perpendicular to the first fixing base and the second fixing base, and the electromagnet may be disposed between the two side plates.

In an embodiment, the number of the fourth guide pillars and the number of the fourth elastic elements may both be two or more, so as to increase the force provided for the electromagnet away from the rotating block.

In an embodiment, the power assembly 1151 may include, for example, a speed reducer in addition to a brake motor. The input shaft of the speed reducer is connected to the output shaft of the motor, and the output shaft of the speed reducer is connected to the power transfer assembly 1152. The power transfer assembly 1152 may be constructed as, for example, an structure including two synchronous wheels and a transmission belt described previously. In this way, the output shaft of the speed reducer may be connected to one of the two synchronous wheels disposed in a lower position. By disposing the speed reducer in the power assembly 1151, it can match the speed and transmit the torque between the motor and the synchronous wheels, which may improve the service life of power transfer assembly to a certain extent.

In an embodiment, the brake assembly 1155 may include, for example, a brake line receiving element 11551, a brake line fixing element 11552, and a brake line 11553. The brake line receiving element 11551 may be fixedly connected to the chassis support of the vehicle chassis. In a case that the brake assembly is released, the brake line receiving element 11551 may receive some brake lines. The brake line fixing element 11552 may be fixedly connected to the translation assembly 1153, which may be specifically disposed on the upper surface of the translation assembly 1153. The brake line 11553 may be led out from the brake line receiving element 11551 and then passes through the brake line fixing element 11552 and extends to the wheel device from the position of the brake line fixing element 11552. One end of the brake line 11553 away from the brake line receiving element 11551 may be fixedly connected to the first pulling rod/the second pulling rod described above. The brake line fixing element 11552 may cause the fixing position of the brake line 11553 and the brake line fixing element 11552 to move with the translation assembly, so that the brake line is tensioned or released, so as to cause the brake line to pull the rotating shaft to rotate.

In an embodiment, as shown in FIG. 11, the brake system 1150 in this embodiment may further include a distance sensor 1156 in addition to the power assembly 1151, the power transfer assembly 1152, the translation assembly 1153, the force accumulation assembly 1154 and the brake assembly 1155. The distance sensor 1156 is used to detect whether the brake assembly 1155 is completely released. In the case of complete release, the electromagnet is energized, so that the vehicle may be maintained in the state without braking, which is convenient for vehicle startup. Specifically, the distance sensor 1156 may be, for example, disposed on the first fixing base included in the force accumulation assembly 1154, to sense the distance between the first fixing base and the translation assembly 1153. In a case that the vehicle starts, the brake motor in the power assembly 1151 starts to run, making the nut in the power transfer assembly 1152 translate along the screw rod in a direction away from the synchronous wheel, thus pushing the translation assembly 1153 to move in a direction close to the first fixing base. In a case that the distance between the translation assembly 1153 and the first fixing base is less than a predetermined distance, a central controller of the vehicle communicatively connected to the distance sensor 1156 may, for example, power on the electromagnet in the force accumulation assembly 1154 through the control circuit, so that the electromagnet may hold the rotating block in the power transfer assembly 1152, so as to cause the third elastic element in the force accumulation assembly 1154 to be in a compressed state, and to achieve energy storage.

In an embodiment, the brake system 1150 may be further provided with a distance measuring plate on the translation assembly 1153, so that the distance sensor 1156 may detect the distance between the translation assembly 1153 and the first fixing base.

The brake system of the embodiment of the present disclosure may achieve the braking control of the driving wheel and/or the steering wheel. Compared with the brake system in related technologies, it can effectively reduce the overall structure size of the brake system, thereby facilitating the miniaturization design of vehicles.

The structure of the electrical system included in the vehicle chassis will be described in detail below with reference to FIG. 12.

Figure 12:
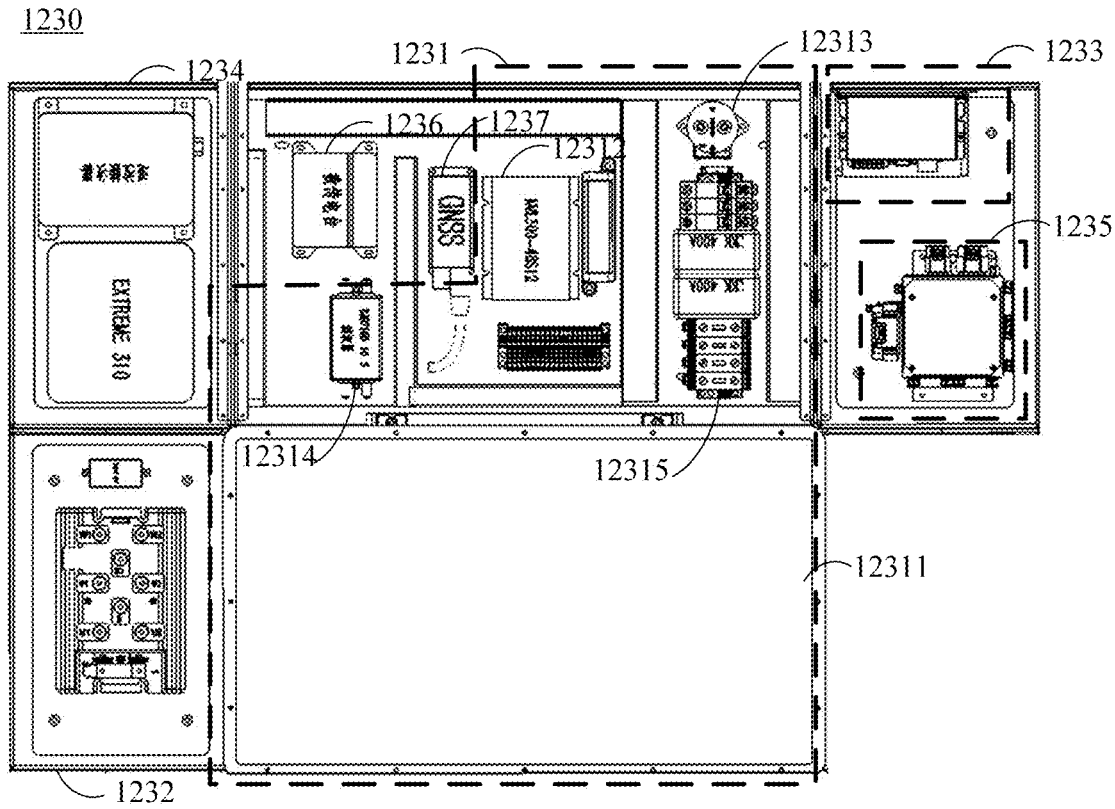
FIG. 12 is a structural diagram of an electrical system according to an embodiment of the present disclosure.

FIG. 12 is a structural diagram of an electrical system according to an embodiment of the present disclosure.

As shown in FIG. 12, the electrical system 1230 of this embodiment may include a power supply module 1231, a first motor driving module 1232, a second motor driving module 1233, a communication module 1234, and a control module 1235.

According to the embodiment of the present disclosure, the power supply module 1231 may include, for example, a battery pack composed of a plurality of battery modules connected in series and/or in parallel. The power supply module 1231 provides a positive terminal for wiring and a negative terminal for wiring, so that it may be electrically connected to other modules in the electrical system except the power supply module through wires to supply power to other modules except the power supply module. The power supply module 1231 may further be provided with a charging interface, and the power supply module 1231 may be charged by inserting the charging gun of the charging pile into the charging interface.

The battery module in the power supply module may be, for example, composed of a lithium battery, a lead acid battery, a nickel metal hydride battery and other batteries in series. Considering the difference of rated voltages of different electronic devices in the vehicle chassis, in order to facilitate the provision of a stable voltage for each electronic device and improve the life of each electronic device, the power supply module may further include, for example, a voltage converter. For example, the rated voltage of the electronic devices in the driving module is usually large, while the rated voltage of each electronic device in the communication module and the control module is usually small.

The first motor driving module 1232 may be, for example, disposed on one side of the power supply module 1231 along a first direction. In a case that the electrical system is mounted on the chassis support of the vehicle chassis, the first direction may be, for example, a width direction of the vehicle chassis. The first motor driving module 1232 may be configured to control the power motor included in the driving system in the vehicle chassis.

The second motor driving module 1233 may be disposed on the other side of the power supply module 1231 along the first direction, and the second motor driving module 1233 is disposed on a side of the first motor driving module 1233 in the second direction. For example, in a case that the electrical system 1230 is mounted on the chassis support in the vehicle chassis, the second motor driving module 1233 is closer to the steering system in the vehicle chassis than the first motor driving module 1232. The second motor driving module 1233 may be configured to control a steering motor and a brake motor in the vehicle chassis. For example, the second motor driving module 1233 may include a steering motor driver and a brake motor driver. The reason why the steering motor driver and the brake motor driver are integrated into the same module is that the steering motor driver and the brake motor driver are usually smaller than the power motor driver. The disposing of being integrated into the same module makes full use of the mounting space in the vehicle chassis. For example, if the vehicle chassis includes two brake systems respectively control the driving wheels and the steering wheels, the motor driver in the second motor driving module 1233 includes a steering motor driver and two brake motor drivers. The second direction is perpendicular to the first direction.

The communication module 1234 is disposed on a side of the first motor driving module 1232 in the second direction, that is, the communication module 1234 and the second motor driving module 1233 are located on the same side of the first motor driving module 1232 in the second direction. Furthermore, the communication module 1234 is also disposed on a side of the power supply module 1231 along the first direction. That is, the communication module 1234 and the first motor driving module 1232 are located on the same side of the power supply module 1231 in the first direction. For example, the communication module 1234 may include a remote control sensor, a network device, and the like.

The control module 1235 may be disposed on a side of the second motor driving module 1233 close to the power supply module 1231 in the second direction. The control module 1235 may include, for example, a central controller. The control module 1235 may communicate, for example, with other modules in the electrical system through the CAN network, to control the work of other modules in the electrical system except the control module. The central controller in the control module 1235 may be, for example, integrated with a battery management system (BMS) to monitor the operation status of the battery pack in the power supply module 1231.

In this embodiment, with the relative position relationship of each module in the electrical system, modules in the electrical system except for the power supply module may be disposed adjacent to the power supply module, thereby improving the centralization of electronic devices in the electrical system, and thus facilitating the miniaturization of the vehicle chassis. Moreover, since there is no overlapping between the electronic components in the height direction, it is facilitated to flatten the vehicle chassis.

It may be understood that the space between the communication module 1234 and the power supply module 1231 in FIG. 12 may be, for example, used to dispose various routing lines, such as the routing of electrical wires and communication cables. Alternatively, the space between the communication module 1234 and the power supply module 1231 may further be configured to dispose a navigation module or a radio module and other functional modules that provide auxiliary functions for the vehicle, which is not limited in this disclosure.

According to the embodiment of the present disclosure, as shown in FIG. 12, in the electrical system 1230 of the embodiment, the power supply module 1231 may include a battery pack 12311, a voltage converter 12312 and a relay 12313.

The battery pack 12311 may be disposed on a side of the first motor driving module 1232 in the first direction. The voltage converter 12312 and the relay 12313 may be arranged in sequence between the communication module 1234 and the control module 1235 in the first direction, and are disposed on a side of the battery pack 12311 close to the communication module 1234 in the second direction. In this way, the space between the communication module 1234 and the control module 1235 may be fully used to improve a centralization of the electrical system.

The voltage converter 12312 and the relay 12313 may be electrically connected to the battery pack 12311 in parallel. For example, an input terminal of the voltage converter 12312 is connected to an output terminal of the battery pack 12311, and an input terminal of the relay 12313 is also connected to the output terminal of the battery pack 12311.

For example, an output terminal of the voltage converter 12312 may be electrically connected to control module 1235. In this way, a voltage output by the battery pack 12311 may be converted into a voltage suitable for the control module 1235 via the voltage converter 12312.

For example, an output terminal of the relay 12313 is electrically connected to the first motor driving module 1232 and the second motor driving module 1233. In this way, it is possible to effectively control the high-power circuit in the driving module through a small control quantity executed at the relay, avoid the circuit burning caused by the excessive power of the circuit in the driving module, and improve the stability of the electrical system.

In an embodiment, the power supply module 1231 may, for example, further include a filter 12314, which may be disposed between the voltage converter 12312 and the communication module 1234. The input terminal of the voltage converter 12312 may be electrically connected to the battery pack 12311 via the filter 12314. In this way, a stable voltage may be provided for the voltage converter 12312 to avoid the influence of electromagnetic interference and the like on the performance and service life of the voltage converter 12312.

In an embodiment, the power supply module 1231 may further include, for example, a fuse element 12315. The fuse element 12315 may be disposed between the battery pack 12311 and the relay 12313. An output terminal of the relay 12313 may be electrically connected to the first motor driving module 1232 and the second motor driving module 1233 via the fuse element 12315. The disposing of the fuse element may play a role of over-current protection and improve the safety and service life of the electrical system.

In an embodiment, the electrical system 1230 may further include, for example, a radio module 1236, which may be disposed between the communication module 1234 and the voltage converter 12312. The radio module 1236 may be electrically connected to the output terminal of the voltage converter 12312, for example. In this way, the voltage converter 12312 may provide an adapted voltage for the radio module 1236 and provide electrical energy for the operation of the radio module 1236.

In an embodiment, the electrical system 1230 may further include, for example, a navigation module 1237, which may include a car integrated navigation system. The navigation module 1237 may be, for example, disposed between the communication module 1234 and the voltage converter 12312. The navigation module 1237 may be electrically connected to the output terminal of the voltage converter 12312. In this way, the voltage converter 12312 may provide the adapted voltage for the navigation module 1237 and provide electrical energy for the operation of the navigation module 1237.

It may be understood that in a case that the electrical system 1230 includes not only the radio module 1236, but also the navigation module 1237. The radio module 1236 and the navigation module 1237 may be, for example, disposed between the communication module 1234 and the voltage converter 12312 in any way. By disposing the radio module 1236 and/or the navigation module 1237 between the communication module and the voltage converter, it is convenient to provide power for the radio module 1236 and/or the navigation module 1237, and it is convenient for the radio module 1236 and/or the navigation module 1237 to communicate with the outside world through the communication module. In this way, it is convenient to reduce the wiring length, further make full use of space, and facilitate the miniaturization design of the electrical system and the vehicle chassis.

It may be understood that electronic devices such as current terminals or voltage terminals may be, for example, disposed between the battery pack 12311 and the voltage converter 12312, to achieve real-time monitoring of power supply parameters.

According to the embodiment of the present disclosure, the power supply module and the control module in the electrical system may be, for example, provided with various connection interfaces as desired in practice. For example, the power supply module may be provided with a power interface to facilitate the connection between each electrical device in the vehicle and the power supply module. For example, the control module may provide a power interface to facilitate the connection of the peripheral electrical devices of the central controller such as a radiator, etc. For example, the control module may provide an input/output interface (I/O) interface to facilitate access to distance sensors, image sensors, etc. to achieve data input/output. For example, the control module may provide bus standard interface, such as CAN bus standard interface, to facilitate communication connection with drivers or encoders.

According to the embodiment of the present disclosure, the first motor driving module may include a left servo motor driver and a right servo motor driver. The second motor driving module may include a steering motor driver, a front wheel brake motor driver (that is a driver driving the brake motor in the first brake system), and a right wheel brake motor driver (that is a driver driving the brake motor in the second brake system). The communication module includes the network device and the remote control sensor. The control module includes the central controller.

Both the network device and the remote control sensor are electrically connected to the voltage converter to operate under the voltage converted by the voltage converter. The network device may communicate, for example, with a WIFI antenna in the vehicle to generate network signals. The remote control sensor may communicate with the remote control antenna in the vehicle to receive remote control signals, etc.

In an embodiment, as shown in FIG. 12, both the radio module 1236 and the navigation module 1237 may be electrically connected to the voltage converter to operate under the voltage converted by the voltage converter. The navigation module 1237 may also be communicatively connected to the antenna assembly described above to receive satellite signals and perform vehicle positioning and navigation.

In an embodiment, the network device, the remote control sensor, the navigation module 1237 and the radio module 1236 may be, for example, connected to the central controller through the communication interface to receive data from the central controller and send data to the central control, so as to facilitate an unified control of the vehicle.

In an embodiment, the control module may be configured to have a first bus standard interface. Through the first bus standard interface, the control module may be communicatively connected to the first motor driving module 1232 and the second motor driving module 1233 to control the motor drivers in the two motor driving modules, so as to control the movement of the vehicle. Specifically, the central controller provides a CAN bus standard interface, which may be communicatively connected to the left servo motor driver, the right servo motor driver, the steering motor driver, the front wheel brake motor driver, and the right wheel brake motor driver through the CAN network to control these motor drivers. For example, by controlling the left servo motor driver, the speed of the left servo motor (that is the driving motor described above) that drives the left driving wheel of the vehicle in the driving system may be controlled. By controlling the right servo motor driver, the speed of the right servo motor that drives the right driving wheel of the vehicle in the driving system may be controlled, so as to control the driving speed of the vehicle. For example, by controlling the steering motor driver, the speed of the steering motor in the steering system may be controlled, thus controlling the driving direction of the vehicle. For example, by controlling the front wheel brake motor driver/the rear wheel brake motor driver, it is possible to control the start or the stop of the brake motor in the first brake system/the second brake system, thereby controlling the braking of the vehicle.

In an embodiment, the steering system may further include a rotating encoder, which is connected to an output shaft of the steering motor. The rotating encoder may accurately control the rotation angle of the steering wheel. Accordingly, the control module may be, for example, further configured to have a second bus standard interface to be communicatively connected to the rotating encoder. Specifically, the central controller may be provided with another CAN bus standard interface, and the rotating encoder may be connected to the another CAN bus standard interface through the CAN network, so that the central controller may control the rotating encoder.

In an embodiment, the central controller in the control module may be, for example, integrated with a BMS. The control module may be communicatively connected to the power supply module through the aforementioned another bus standard interface or an additional bus standard interface. Specifically, the control module may be communicatively connected to the current terminal, etc. in the power supply module to monitor the operation status of the battery pack in the power supply module.

In an embodiment, in addition to the vehicle chassis, the vehicle may further include a signal system for providing an indication signal to the driver. For example, the signal system may include a control power supply indicator, a system power supply indicator and a buzzer. Each electronic device in the signal system may be connected to the central controller. For example, the control module may be configured to have a first input/output interface for connecting with the signal system. Specifically, the central controller is provided with a first I/O interface, and the control power supply indicator, the system power supply indicator and the buzzer, etc. may be connected to the first I/O interface to work under the control of the programmable circuit in the central controller. In an embodiment, the signal system may further include reserved communication interfaces to facilitate access to mobile communication devices and improve the degree of vehicle intelligence.

In an embodiment, the battery pack 12311 may connect a circuit of an emergency stop button, a circuit of a key switch and the filter in series. In this way, the filter and the voltage converter may be started only in a case that the circuit of the emergency stop button is switched on and the circuit of the key switch is switched on.

In an embodiment, the first brake system/the second brake system may include, for example, an electromagnet, which may be connected to the control module and electrically connected to the voltage converter. For example, the control module may further be configured to have a second input/output interface, which is connected to the electromagnet via the second input/output interface. For example, the central controller may be provided with a second I/O interface to send programmable control signals to the electromagnet, and control an electrical connection between the electromagnet and the voltage converter, so as to control the power on or off of the electromagnet. For example, in a case that the electromagnet is energized, it may generate, for example, magnetic force and attract a ferromagnet, so that the first brake line/the second brake line is in a taut state, thus controlling the vehicle to brake. Whether the electromagnet is energized or not may be, for example, controlled by the central controller, or a switch that may be switched on or switched off by mechanical transmission may be disposed to make the electromagnet power off or energized by switching on of the switch or switching off of the switch.

In an embodiment, the control module may further be configured to have a third input/output interface, via which the control module is connected to the sensor in the vehicle chassis, to provide a programmable control signal to the sensor. The sensor in the vehicle chassis may include, for example, a distance sensor, a temperature sensor, etc., which is not limited in the present disclosure.

In an embodiment, the electrical system further includes a radiator. For example, it may be configured to have a controller radiator. The controller radiator may be, for example, disposed close to the control module for cooling the central controller, etc. Accordingly, the power supply module may be configured to have a first power interface for electrical connection to the controller radiator. The controller radiator may be, for example, further connected to the central controller through the input/output interface, to operate under the control of the programmable control signal of the central controller. For example, in a case that the temperature of the vehicle chassis is high, the speed of the controller radiator is increased to improve the heat dissipation efficiency.

In an embodiment, the electrical system may further be provided with a motor radiator. The motor radiator may be, for example, disposed close to at least one of left/right servo motors (i.e. driving motors), steering motors, and front/rear wheel brake motors to dissipate heat for motors, etc. Accordingly, the power supply module may be provided with a second power interface for electrical connection to the motor radiator. The motor radiator may also be, for example, connected to the central controller through the input/output interface to operate under the control of the programmable control signal of the central controller. For example, in a case that the driving speed of the vehicle is high, the speed of the motor radiator 558 is increased to improve the heat dissipation efficiency.

The structure of the power supply module in the electrical system will be described in detail below with reference to FIG. 13.

Figure 13:
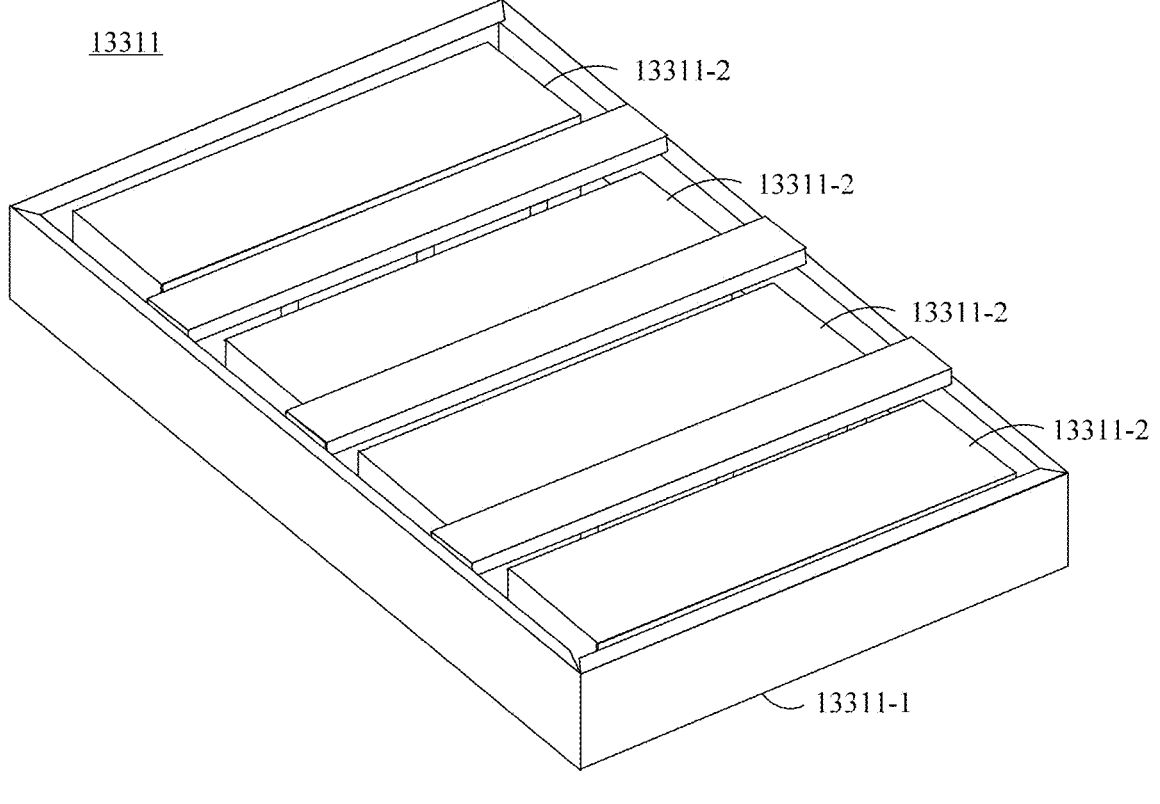
FIG. 13 is a structural diagram of a power supply module according to an embodiment of the present disclosure.

FIG. 13 is a structural diagram of a power supply module according to an embodiment of the present disclosure, As shown in FIG. 13, the battery pack 13311 in the power supply module may include a battery receiving device 13311-1 and a plurality of battery modules 13311-2.

In an embodiment, the battery module 13311-2 may be, for example, composed of a plurality of battery cells connected in series and parallel. For example, the battery cell may be, for example, a high energy density battery cell, so as to improve the power that the battery module 13311-2 may store, and improve the charging efficiency of the battery module 13311-2. For example, the battery cell may be made of lithium ion or lithium polymer, which is not limited in the present disclosure.

In an embodiment, the battery receiving device 13311-1 may include a receiving cavity, a plurality of second stiffeners and a plurality of guide rods.

The receiving cavity may have an opening. For example, the receiving cavity may include a bottom wall and four side walls. The four side walls are connected in sequence, and are fixedly connected to the bottom wall to form the opening of the receiving cavity.

Each of the plurality of second stiffeners may be fixed on two opposite side walls of the receiving cavity. For example, each of the plurality of second stiffeners may be fixed on two opposite side walls with longer length among the four side walls, that is, an extension direction of each of the plurality of the second stiffeners is a first direction, and the first direction may be a width direction of the opening. Or each of the plurality of the second stiffeners may be fixed on two opposite side walls with shorter length among the four side walls, that is, an extension direction of each of the plurality of the second stiffeners is a second direction, and the second direction may be a length direction of the opening. The first direction is perpendicular to the second direction. Alternatively, parts of the second stiffeners may extend in the first direction, and other parts of the second stiffeners may extend in the second direction. The second stiffener in the first direction is crisscrossed with the second stiffener in the second direction.

In an embodiment, the plurality of second stiffeners may be arranged periodically, so that the pressure that is tolerable by different areas of the battery receiving device 13311-1 is balanced. The shape of each of the plurality of the second stiffeners may be a cuboid or a trapezoid, etc. The plurality of second stiffeners may be integrally formed with the receiving cavity, or may be detachably connected to the receiving cavity.

The plurality of guide rods may extend from at least some of the second stiffeners to the bottom wall of the receiving cavity opposite to the opening, and the plurality of guide rods are fixed on the bottom wall. For example, each of the at least some of the second stiffeners may be extendedly provided with one or more guide rods. Alternatively, one or more guide rods may be extendedly disposed on each of the plurality of second stiffeners. In order to improve the stability, at least two guide rods are extendedly disposed on each second stiffener, and the at least two guide rods are evenly distributed on the second stiffener.

In an embodiment, the plurality of guide rods may be, constructed as for example, a columnar structure or a cuboid structure, etc., which is not limited in the present disclosure. For example, the plurality of guide rods may further be symmetrically arranged relative to a center point of the receiving cavity, so as to improve the uniformity of the pressure borne by the battery receiving device. For example, the plurality of guide pillars may be integrally formed with the plurality of second stiffeners, or may be detachably connected to the plurality of second stiffeners, which is not limited in the present disclosure.

With the plurality of second stiffeners in the embodiment, a plurality of receiving spaces may be enclosed with the receiving cavity, and the plurality of receiving spaces may be configured to receive battery modules. A depth of the receiving cavity shall be disposed to ensure that the battery module received in the receiving space is disposed at a position lower than the position at which the plurality of second stiffeners are disposed. In this way, in a case that the battery module is received in the battery receiving device and subjected to pressure, the pressure directly acts on the plurality of second stiffeners and is transmitted to the bottom wall of the battery receiving device 13311-1 through the plurality of guide rods. In this way, the pressure resistance of the battery receiving device 13311-1 may be improved, the battery module may be protected from pressure, and damage of the battery module caused by pressure may be avoided, so as to improve the power supply stability and service life of the battery module.

In an embodiment, the battery receiving device 13311-1 includes a cover in addition to the receiving cavity, the plurality of second stiffeners and the plurality of guide rods.

The size of the cover may be matched with the size of the opening of the receiving cavity. For example, the cover may be, for example, fixedly connected to the receiving cavity through a fixing element to cover the opening of the receiving cavity, so that the battery modules received in the plurality of receiving spaces formed by the receiving cavity and the plurality of second stiffeners may be protected from wind and rain, and the service life of the battery modules and the stability of power supply may be improved. For example, the size of the cover may be slightly larger than the size of the opening of the receiving cavity to ensure the integrity of covering the opening.

In an embodiment, a fixing groove may be provided on the side wall, which forms the opening, of the receiving cavity, on a side of the side wall close to the opening. For example, the fixing groove may be disposed on an end face of the side wall away from the bottom wall. Correspondingly, the inner surface of the cover may be provided with a bump matching the fixing groove. In a case that the cover is connected to the receiving cavity, a convex block of the cover may be clamped in the fixing groove of the receiving cavity, and then the cover may be fixedly connected to the receiving cavity by using the fixing element. Through the disposing of the fixing groove and the bump, the stability of the connection between the cover and the receiving cavity may be improved.

In an embodiment, the battery receiving device 13311-1 may further include a seal which is disposed in a fixing groove disposed on the side wall. In this way, in a case that the cover is fixedly connected to the receiving cavity, external impurities (such as moisture or dust, etc.) may be prevented from invading the receiving space from the joint surface contacting the receiving cavity and the cover. In this way, the battery receiving device 13311-1 may be waterproof and dust-proof to ensure the safety of power supply of the battery module. For example, the seal may be a rubber ring, which is not limited in the present disclosure.

For example, by disposing the seals in the battery receiving device 13311-1, the battery receiving device 13311-1 may reach an IP67 level of protection and safety after receiving the battery modules.

In an embodiment, at least one through hole may be disposed on at least one side wall forming the opening of the receiving cavity. The through holes may be configured to be passed through by the connecting lines between the battery module and the external devices. The connecting lines may include, for example, wires or communication cables, which is not limited in the present disclosure. For example, the through holes may be a plurality of through holes, and the plurality of through holes may be arranged periodically on the side wall. By disposing the at least one through hole, the convenience and regularity of wiring may be improved, and the closeness of the receiving space may be ensured as much as possible.

In an embodiment, the battery receiving device 13311-1 may further include an even number of handles. The even number of handles may be symmetrically disposed on the outside of two opposite side walls of the receiving cavity, so as to facilitate the movement of the battery receiving device 13311-1.

For example, the handle may be an arc element with an extended edge, and the handle is fixedly connected to the side wall of the receiving cavity through the extended edge.

For example, the handle may include a handle fixing element and a pull ring. The handle is fixedly connected to the side wall of the receiving cavity through the handle fixing element, and the pull ring is rotationally connected to the fixing element. In this way, the battery receiving device may be lifted by pulling the pull ring. In a case that it is not necessary to lift the battery receiving device, the pull ring may be close to the side wall of the receiving cavity, thereby reducing the overall size of the battery receiving device 13311-1.

In an embodiment, in a case that the number of handles is two, the handle may be disposed at the center of the side wall. In a case that the number of handles is four or more, the handles may be arranged periodically on the side wall. By defining the position of the handles, the stability of lifting the battery receiving device may be ensured.

It may be understood that the handle and at least one through hole may be disposed on two opposite side walls or on the same side wall, which is not limited in the present disclosure.

In an embodiment, the battery receiving device 13311-1 may further include a fixing positioning element. The fixing positioning element may be fixed on the side wall of the receiving cavity. The embodiment may use connector(s) to detachably connect the fixing positioning element with the chassis support of the vehicle, so as to integrate the battery module on the electrical device such as the vehicle, etc. The connector may be a screws, a bolt, etc.

In addition, it should be noted that the present disclosure does not limit the position(s), the extension direction(s) and the size(s) of the plurality of stiffeners, and the embodiments of the present disclosure may dispose as desired in practice.

For example, in an embodiment, the plurality of stiffeners may be arranged in parallel along the width direction of the opening of the receiving cavity. Compared with the scheme disposing along the length direction of the opening of the receiving cavity, the scheme disposing along the width direction of the opening of the receiving cavity may improve the compression resistance of the battery receiving device. For example, the plurality of stiffeners arranged in parallel along the width direction of the opening may be arranged periodically, or closely arranged close to the center of the opening, or sparsely arranged at the edge of the opening, which is not limited in the present disclosure.

For example, in an embodiment, in the plurality of stiffeners, the width of each of the plurality of stiffeners close to the center of the opening may be, for example, greater than the width of each of the plurality of stiffeners away from the center of the opening. In this way, the pressure resistance of the central area of the battery receiving device may be improved.

Based on the vehicle chassis provided by the present disclosure, the present disclosure further provides a vehicle. The structure of the vehicle will be described in detail below with reference to FIGS. 14 to 15.

Figure 14:
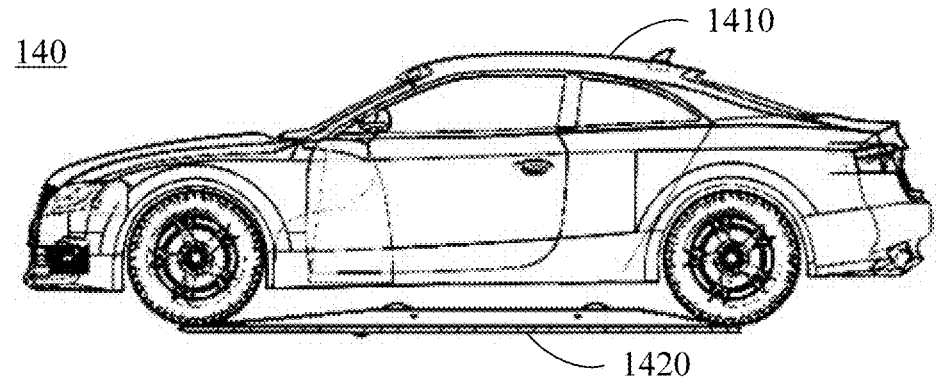
FIG. 14 is a structural diagram of a vehicle according to an embodiment of the present disclosure.

FIG. 14 is a structural diagram of a vehicle according to an embodiment of the present disclosure.

As shown in FIG. 14, a vehicle 140 of this embodiment may include a housing 1410 and a vehicle chassis 1420. The housing 1410 is located above the vehicle chassis 1420 and covers the vehicle chassis 1420.

The housing 1410 may be, for example, a vehicle model of the vehicle. The housing 1410 may be detachably connected to the vehicle chassis 1420 through a connector such as a Velcro or a clip, etc. The housing 1410 may be, for example, made of an elastic material such as plastic foam, etc. In this way, in a case that the vehicle chassis 1420 is the vehicle chassis of the test target vehicle, by covering the housing 1410 on the vehicle chassis 1420, it may effectively protect the automatic driving vehicle and reduce the test cost, in a case that the automatic driving vehicle is tested by using the test target vehicle, in a case that the automatic driving vehicle collides with the test target vehicle due to poor control effect.

In an embodiment, the vehicle 140 may further include an auxiliary wheel device in addition to the housing 1410 and the vehicle chassis 1420. The auxiliary wheel device may be detachably connected to the vehicle chassis 1420. For example, in a case that the vehicle 140 needs to be transferred or dragged away due to faults, the housing 1410 may be removed from the vehicle chassis 1420 and the auxiliary wheel device may be mounted on the vehicle chassis 1420. In this way, with the help of the auxiliary wheel device, the vehicle chassis 1420 may be dragged and moved with less effort. In a case that the vehicle 140 is not required to move, the auxiliary wheel device may be removed from the vehicle chassis 1420 for testing.

For example, in a case that the vehicle chassis is used as the test target vehicle, the overall height of the vehicle chassis 1420 is reduced by removing the auxiliary wheel device from the vehicle chassis 1420 in a case that the vehicle chassis is not required to move. In this way, in the automatic driving safety test of the automatic driving vehicle, the requirements of the height of the chassis of the automatic driving vehicle may be reduced, which is convenient for expanding the application scenario of the test target vehicle and reducing the requirements for the test conditions.

In an embodiment, the number of the auxiliary wheel devices may be, for example, at least two. In a case that the at least two auxiliary wheel devices are connected to the vehicle chassis, they may be evenly or symmetrically distributed in the area close to the periphery of the vehicle chassis 1420, so as to improve the stability and balance of the vehicle chassis when moving under the dragging effect. For example, the number of the auxiliary wheel devices may be four, and the four auxiliary wheel devices may be symmetrically connected to the vehicle chassis. For example, a first end of the vehicle chassis 1420 in the length direction of the vehicle chassis is connected to two auxiliary wheel devices, and the two auxiliary wheel devices are symmetrical with respect to the central axis in the length direction of the vehicle chassis 1420. The other end of the vehicle chassis 1420 in the length direction is connected to two auxiliary wheel devices, and the two auxiliary wheel devices are symmetrical with respect to the central axis of the vehicle chassis 1420 in the length direction.

In an embodiment, the vehicle chassis may be, for example, provided with a second fixing block for detachably fixing the auxiliary wheel device. For example, the second fixing block and the auxiliary wheel device may be detachably connected via the connector, and the connection between the auxiliary wheel device and the vehicle chassis may be achieved via the connection between the auxiliary wheel device and the second fixing block.

For example, the second fixing block may be provided with a threaded hole, the auxiliary wheel device includes a fixing plate which is rotationally connected to the auxiliary wheel, and the fixing plate is further provided with a threaded hole. The second fixing block may be connected to the auxiliary wheel device by bolts, etc.

In an embodiment, the vehicle chassis 1420 may further be provided with a pull ring, which may be disposed on the frame of the vehicle chassis. Specifically, the pull ring may be fixedly connected to the frame at one end along the length direction of the chassis support through external fixing parts such as bolts, etc.

In an embodiment, in a case that the vehicle chassis needs to be dragged, the pull ring may be hooked by the hook element, and the pull ring may be applied by dragging the hook element. A pull force may be transferred to the auxiliary wheel device connected to the vehicle chassis through the vehicle chassis, so that the auxiliary wheel in the auxiliary wheel device may rotate and drive the vehicle chassis to move along a direction of the pull force.

In an embodiment, in addition to at least one first fixing block, the vehicle 140 may further include at least one screw rod fitting element, which is fixedly connected to the vehicle chassis.

In an embodiment, the screw rod fitting element may include a clamp block with a groove and a flange type screw rod nut, which is clamped in the groove of the clamp block and fixedly connected to the clamp block.

In an embodiment, the number of the screw rod fitting elements may be four, and the four screw rod fittings may be disposed symmetrically relative to the center point of the vehicle chassis 1420. Through disposing of the screw rod fitting elements, the screw rod may rotate in the screw rod fitting and be close to or away from the ground. After the screw rod contacts the ground by rotating the screw rod, the vehicle chassis may be lifted off the ground by continuously rotating the screw rod, so as to facilitate mounting or removal of the auxiliary wheel device.

The auxiliary wheel device will be described in detail below with reference to FIG. 15.

Figure 15:
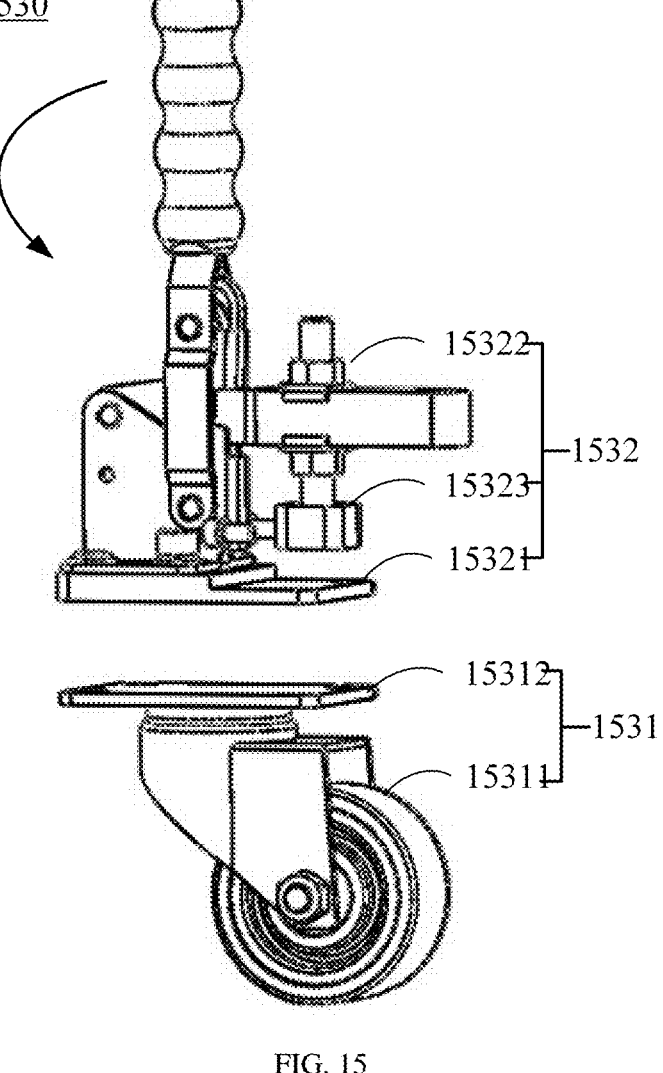
FIG. 15 is a structural diagram of an auxiliary wheel device according to an embodiment of the present disclosure.

FIG. 15 is a structural diagram of an auxiliary wheel device according to an embodiment of the present disclosure.

As shown in FIG. 15, the auxiliary wheel device 1530 of this embodiment may include a wheel assembly 1531 and a quick release assembly 1532. The wheel assembly 1531 may be detachably connected to the quick release assembly 1532.

In an embodiment, the quick release assembly 1532 may include a fixing base 15321 and an elbow clamp 15322. The fixing base 15321 may be fixedly connected to the elbow clamp 15322. The wheel assembly 1531 may be detachably connected to the wheel assembly 1531 via the fixing seat 15321.

The elbow clamp 15322 may be, for example, a vertical compression type elbow clamp, a horizontal compression type elbow clamp, and the like. The elbow clamp is designed according to the principle of the double rocker mechanism in a planar four bar mechanism. The elbow clamp 15322 may include a shaft fixing seat, a handle, a rotating arm and a rotating shaft. In an embodiment, the shaft fixing seat may act as the fixing seat 15321 in the quick release assembly 1532, or may be fixedly connected to the fixing seat 15321 in the quick release assembly 1532. The shaft fixing seat may be composed of two fixing plates, and the number of the rotating shaft may be two, one of which is fixed between the two fixing plates. One end of the rotating arm may be sleeved on one of the two rotating shafts to rotate relative to one of the two rotating shafts. The other end of the rotating arm may be provided with a pressing element 15323. A connector is clamped on the outer wall of the rotating arm between the two ends of the rotating arm. The rotating arm may be hinged with the handle via the connector. The other one of the two rotating shafts may pass through the two fixing plates and be fixedly connected to the two fixing plates. The position of the other one of the two rotating shafts may correspond to the clamping position of the connector clamped at the outer wall of the rotating arm. The handle is sleeved on the other one of the two rotating shafts. Under the action of external force, the handle may rotate around the other one of the two rotating shafts, and drive the rotating arm to rotate around one of the two rotating shafts through the connector. Through the rotation of the rotating arm, the pressing element may be driven to move, so that the pressing element is close to the fixing block described above, and pressed into the groove of the fixing block. Alternatively, through the rotation of the rotating arm, the pressing element may be driven to pull out of the groove of the fixing block. It may be understood that, in the example shown in FIG. 6, the elbow clamp 15322 is in a locked state. In a case that the elbow clamp 15322 is in a self-locking state, if the handle is rotated in the arrow direction in FIG. 15, the elbow clamp 15322 may be in an unlocked state. If the handle is rotated in the direction opposite to the arrow direction in FIG. 15 and the dead center position is rotated when the elbow clamp 15322 is in the unlocked state, the elbow clamp 15322 may return to the locked state.

In an embodiment, for example, the handle may be rotated in an arrow direction shown in FIG. 15 to drive the rotating arm to rotate, so that the compression element may move upward and be pulled away from the groove of the fixing block. It may be understood that the elbow clamp may have any structure in the related technology, which is not limited in the present disclosure.

With the quick release assembly on the wheel device, the embodiment may make the wheel device quickly mounted on the frame or quickly removed from the frame, which is convenient to improve the efficiency of wheel mountain and removal. At the same time, the connection stability between the wheel device and the frame may be ensured by using the elbow clamp, because the elbow clamp is designed based on the dead center clamping principle.

In an embodiment, as described above, the material of the compression element 15323 may include, for example, the elastic material, in order to achieve an interference fit between the compression element 15323 and the fixing block on the frame.

In an embodiment, as shown in FIG. 15, the wheel assembly 1531 may include, for example, an auxiliary wheel 15311 and a fixing element 15312. The fixing element 15312 may be rotationally connected to the auxiliary wheel 15311, and the fixing element 15312 may be detachably connected to the fixing seat 15321 in the quick release assembly 1532. For example, the fixing element 15312 may be rotationally connected to the auxiliary wheel 15311 via the rotating shaft.

For example, the fixing element 15312 may include a fixing plate and an extension element. The extension element is rotationally connected to the auxiliary wheel 15311 via a rotating wheel, and the fixing plate is fixedly connected to the fixing seat 15321 of the quick release assembly 1532. The auxiliary wheel 15311 may rotate relative to the fixing element 15312.

It may be understood that the structure of the wheel assembly in FIG. 15 is only illustrative in order to facilitate understanding of the present disclosure, which is not limited in the present disclosure.

According to the embodiment of the present disclosure, when mounting the auxiliary wheel device 1530, the elbow clamp 15322 is in an unlocked state. At this time, the elbow clamp 15322 may be moved to a position of the vehicle chassis at which the second fixing block is disposed, so that the area of the vehicle chassis in which the second fixing block is disposed is located between the fixing base 15321 and the rotating arm of the elbow clamp. Then, the handle of the elbow clamp 15322 is pushed in the direction opposite to the arrow direction in FIG. 15, so that the compression element on the rotating arm moves downward until the handle is pushed to the dead center position. In this way, the compression element is inserted into the groove of the second fixing block and an interference fit between the compression element and the second fixing block is achieved. In other words, the auxiliary wheel device 1530 and the second fixing block are in the state as shown in FIG. 7, so as to achieve the fixing connection between the auxiliary wheel device and the vehicle chassis.

When removing the auxiliary wheel device 1530, the handle in the arrow direction in FIG. 15 is pressed, such that the fastener moves upward and is pulled out from the groove of the second fixing block, thereby achieving the removal of the auxiliary wheel device 1530.

In an embodiment, the height of the vehicle after mounting the auxiliary wheel device may be greater than the height of the vehicle without mounting the auxiliary wheel device. In this way, the height of the vehicle chassis may be improved by mounting the auxiliary wheel device. In this way, the approach angle and the departure angle of the vehicle may be improved, facilitating the transition of vehicle. For example, if the auxiliary wheel device is not mounted, due to the low chassis of the vehicle, the vehicle may not drive into the carriage carrying vehicles through the ramp. After the auxiliary wheel device is mounted, it is convenient for vehicles to drive into the carriage carrying vehicles via the ramp, which provides great convenience for the transition of vehicles.

It should be noted that acquiring, collecting, storing, using, processing, transmitting, providing, and disclosing etc. of personal information of the user involved in the present disclosure all comply with the relevant laws and regulations, and do not violate the public order and morals.

The above specific embodiments do not constitute a limitation on the scope of protection of the present disclosure. Those skilled in the art should understand that various modifications, combinations, sub combinations and substitutions may be made according to design requirements and other factors. Any modification, equivalent replacement and improvement made within the spirit and principles of this disclosure shall be included in the scope of protection of this disclosure.

What is claimed is:

1. A vehicle chassis, comprising a chassis support, a steering system, an electrical system, a driving system and two brake systems, wherein the chassis support is provided with a steering system mounting site, an electrical system mounting site, a driving system mounting site and two brake system mounting sites; wherein:

the steering system mounting site, the electrical system mounting site and the driving system mounting site are arranged in sequence along a length direction of the vehicle chassis;

a first brake system mounting site of the two brake system mounting sites is disposed between the steering system mounting site and the electrical system mounting site; and a second brake system mounting site of the two brake system mounting sites is disposed between the driving system mounting site and the electrical system mounting site, wherein the two brake systems, the driving system and the steering system are communicatively connected to the electrical system;

the vehicle chassis further comprises two antenna modules communicatively connected to the electrical system;

the chassis support is further provided with two antenna mounting sites, wherein a first antenna mounting site of the two antenna mounting sites is disposed between the steering system mounting site and the electrical system mounting site, and a second antenna mounting site of the two antenna mounting sites is disposed between the driving system mounting site and the electrical system mounting site;

the first antenna mounting site and the first brake system mounting site are arranged in sequence along a width direction of the vehicle chassis, and the second antenna mounting site and the second brake system mounting site are arranged in sequence along the width direction of the vehicle chassis;

the antenna module comprises:

an antenna assembly; and an antenna support, comprising:

a first fixing plate;

at least two first guide pillars, wherein each of the at least two first guide pillars has one end being fixed on the first fixing plate;

a second fixing plate, wherein the second fixing plate is sleeved on the at least two first guide pillars, and the second fixing plate is configured to be movable along a length direction of the at least two first guide pillars; and at least two first elastic elements, wherein the at least two first elastic elements are respectively sleeved on the at least two first guide pillars, the at least two first elastic elements are located between the second fixing plate and the first fixing plate, and each of the at least two first elastic elements has one end being fixed on the first fixing plate; and the second fixing plate is provided with a fixing element configured to fix the antenna assembly.

2. The vehicle chassis of claim 1, wherein:

the chassis support is provided with a plurality of first stiffeners extending along a vertical direction, and the plurality of first stiffeners have a height less than or equal to a height of the steering system mounting site, a height of the electrical system mounting site, a height of the driving system mounting site and a height of the two brake system mounting sites.

3. The vehicle chassis of claim 1, wherein the vehicle chassis further comprises:

a cover plate detachably covering the chassis support.

4. The vehicle chassis of claim 1, wherein the steering system comprises:

two steering wheel devices; and a steering driving device, the steering driving device comprising:

a motor assembly;

a steering gear having an input end connected to an output shaft of the motor assembly, and two output ends; and two transmission bars, wherein one ends of the two transmission bars are respectively connected to the two output ends of the steering gear, and the other ends of the two transmission bars are respectively connected to the two steering wheel devices, wherein the steering gear is configured such that the input end of the steering gear is driven by the motor assembly to rotate, so as to drive the two output ends to move in a direction perpendicular to the input end of the steering gear, in order to control a rotation direction of steering wheels of the two steering wheel devices.

5. The vehicle chassis of claim 4, wherein the motor assembly comprises a steering motor and a speed reducer; an input shaft of the speed reducer is connected to an output shaft of the steering motor; wherein the steering driving device further comprises:

a coupling disposed between the speed reducer and the steering gear, wherein one end of the coupling is connected to an output shaft of the speed reducer, and the other end of the coupling is connected to the input end of the steering gear, wherein the speed reducer is a right angle speed reducer.

6. The vehicle chassis of claim 4, wherein the steering wheel device comprises:

a wheel suspension assembly;

a connecting assembly fixedly connected to a second elastic element of the wheel suspension assembly; and a steering wheel assembly comprising a steering wheel and a steering wheel hub, wherein the steering wheel is sleeved on the steering wheel hub, and the steering wheel hub is in a transmission connection with the connecting assembly.

7. The vehicle chassis of claim 6, wherein the wheel suspension assembly comprises:

a mounting support comprising a first mounting plate and a second mounting plate;

the second elastic element, wherein one end of the second elastic element is fixedly connected to the first mounting plate;

a second guide pillar, wherein two ends of the second guide pillar are respectively fixed to the first mounting plate and the second mounting plate; and a first fixing block, wherein the first fixing block is sleeved on the second guide pillar, and the first fixing block is fixedly connected to the other end of the second elastic element;

wherein the first fixing block is configured to be connected to the steering wheel assembly through the connecting assembly, so as to be driven by the connecting assembly to move along the second guide pillar as the steering wheel assembly moves up and down, so that the second elastic element is compressed or stretched.

8. The vehicle chassis of claim 7, wherein the steering wheel device further comprises:

two first drum brake pads opposite to each other, wherein the two first drum brake pads are disposed between the steering wheel and the steering wheel hub, and the steering wheel hub is clamped in a space enclosed by the two first drum brake pads;

a first rotating shaft clamped between a first end of one of the two first drum brake pads and a first end, which is close to the first end of one of the two first drum brake pads, of the other one of the two first drum brake pads;

a first fixing shaft clamped between a second end of one of the two first drum brake pads and a second end, which is close to the second end of one of the two first drum brake pads, of the other one of the two first drum brake pads; and a first pulling rod fixedly connected to the first rotating shaft and fixedly connected to a first brake line in the first brake system, wherein the steering wheel device is configured such that in a case that the first brake line is tensioned, the first brake line drives the first pulling rod and the first fixing shaft to rotate, so as to increase a spacing between the two first ends and increase a friction between the two first drum brake pads and the steering wheel; in a case that the first brake line is released, the first brake line drives the first pulling rod and the first fixing shaft to rotate, so as to decrease a spacing between the two first ends and decrease a friction between the two first drum brake pads and the steering wheel.

9. The vehicle chassis of claim 1, wherein the driving system comprises two driving wheel devices and two driving devices respectively connected to the two driving wheel devices; wherein:

the driving wheel device comprises a driving wheel hub and a driving wheel;

the driving device comprises:

a driving motor;

a power transfer assembly, wherein the power transfer assembly is connected to an output shaft of the driving motor and the driving wheel hub, the power transfer assembly is configured to transfer the power provided by the driving motor to the driving wheel hub to drive the driving wheel to rotate;

a third mounting plate configured to mount the driving motor on the vehicle chassis; and a damping assembly comprising a rotation shaft fixedly connected to the third mounting plate and a rotating arm connected to the rotation shaft, wherein the rotating arm is configured to rotate by taking the rotation shaft as an axis of rotation, wherein an extension direction of the rotation shaft is perpendicular to a direction in which the power transfer assembly drives the driving wheel to rotate.

10. The vehicle chassis of claim 9, wherein the driving wheel device further comprises:

two second drum brake pads opposite to each other, wherein the two second drum brake pads are disposed between the driving wheel and the driving wheel hub, and the driving wheel hub is clamped in a space enclosed by the two second drum brake pads;

a second rotating shaft clamped between a third end of one of the two second drum brake pads and a third end, which is close to the third end of one of the two second drum brake pads, of the other one of the two second drum brake pads;

a second fixing shaft clamped between a fourth end of one of the two second drum brake pads and a fourth end, which is close to the fourth end of one of the two second drum brake pads, of the other one of the two second drum brake pads; and a second pulling rod fixedly connected to the second rotating shaft and fixedly connected to a second brake line in the second brake system, wherein the driving wheel device is configured such that in a case that the second brake line is tensioned, the second brake line drives the second pulling rod and the second rotating shaft to rotate, so as to increase a spacing between the two third ends, and increase a friction between the two second drum brake pads and the driving wheel; in a case that the second brake line is released, the second brake line drives the second pulling rod and the second rotating shaft to rotate, so as to decrease a spacing between the two third ends, and decrease a friction between the two second drum brake pads and the driving wheel.

11. The vehicle chassis of claim 1, wherein any one of the two brake systems comprises:

a power assembly, a power transfer assembly connected to an output shaft of the power assembly;

a translation assembly connected to the power transfer assembly, wherein the translation assembly is configured to be driven by the power transfer assembly to translate;

a force accumulation assembly connected to the translation assembly, wherein the force accumulation assembly is configured to be pushed by the translation assembly to store energy; and a brake assembly connected to the translation assembly and a wheel device of the vehicle, wherein the brake assembly is configured to be driven by the translation assembly so as to be tensioned or released, wherein the force accumulation assembly is configured to, in a case that the vehicle comprising the vehicle chassis is powered off, release energy and push the translation assembly to translate, so that the brake assembly is tensioned and drives the drum brake pads in the steering system to apply force to the steering wheel in the steering system or drives the drum brake pads in the driving system to apply force to the driving wheel in the driving system.

12. The vehicle chassis of claim 1, wherein the electrical system comprises:

a power supply module, a first motor driving module disposed on a side of the power supply module along a first direction, wherein the first motor driving module is configured to control a power motor in the vehicle chassis;

a second motor driving module disposed on the other side of the power supply module along the first direction and on a side of the first motor driving module in a second direction; wherein the second motor driving module is configured to control the steering motor and a brake motor in the vehicle chassis, and the second direction is perpendicular to the first direction;

a communication module disposed on a side of the first motor driving module in the second direction and on a side of the power supply module in the first direction; and a control module disposed on a side of the second motor driving module close to the power supply module in the second direction, wherein the first motor driving module, the communication module, the second motor driving module and the control module are electrically connected to the power supply module.

13. A vehicle, comprising:

a housing; and the vehicle chassis according to claim 1, wherein the housing is located above the vehicle chassis and covers the vehicle chassis.

14. The vehicle of claim 13, wherein the vehicle further comprises at least one auxiliary wheel device and at least one second fixing block; wherein:

each auxiliary wheel device of the at least one auxiliary wheel device comprises:

a wheel assembly; and a quick release assembly comprising a fixing base and an elbow clamp, wherein the fixing base is fixedly connected to the elbow clamp, the fixing base is detachably connected to the wheel assembly, and a rotation arm of the elbow clamp is provided with a compression element;

wherein the at least one second fixing block are fixedly connected to the vehicle chassis, and each of the at least one second fixing block is provided with a groove, wherein the vehicle is configured such that in a case of an interference fit between the compression element of the elbow clamp of the at least one auxiliary wheel device and the groove of the at least one second fixing block, the auxiliary wheel device is connected to the vehicle chassis.

15. The vehicle of claim 14, wherein in a case that the auxiliary wheel device is connected to the vehicle chassis, a height of the vehicle is a first height, and in a case that the auxiliary wheel device is not connected to the vehicle chassis, the height of the vehicle is a second height, and the first height is greater than the second height.

16. The vehicle of claim 13, wherein:

the housing detachably is located above the vehicle chassis and covers the vehicle chassis, and a material of the housing comprises an elastic material.

\* \* \* \* \*